United States Patent [19]
Uchida et al.

[11] Patent Number: 5,667,429
[45] Date of Patent: Sep. 16, 1997

[54] FLOOR SURFACE BLASTING APPARATUS

[75] Inventors: Kiyoshi Uchida; Yoshikazu Miyachi, both of Nagoya; Kengo Hamanaka; Yoichiro Ban, both of Tokyo; Nagio Minami; Tadashi Nobushige, both of Hiroshima, all of Japan

[73] Assignees: Chubu Electric Power Company, Inc., Aichi-ken; Mitsubishi Jukogyo Kabushiki Kaisha, Tokyo, both of Japan

[21] Appl. No.: 414,936

[22] Filed: Mar. 31, 1995

Related U.S. Application Data

[62] Division of Ser. No. 182,235, Jan. 18, 1994, Pat. No. 5,435,773, which is a division of Ser. No. 935,179, Aug. 26, 1992, Pat. No. 5,339,573.

[30] Foreign Application Priority Data

| Aug. 27, 1991 | [JP] | Japan | 3-068014 |
| Aug. 27, 1991 | [JP] | Japan | 3-214908 |
| Sep. 18, 1991 | [JP] | Japan | 3-267257 |
| Sep. 18, 1991 | [JP] | Japan | 3-267258 |
| Mar. 18, 1992 | [JP] | Japan | 4-014575 |

[51] Int. Cl.$^6$ ..................... B24C 3/06
[52] U.S. Cl. ................. 451/87; 451/92; 451/456
[58] Field of Search .............. 451/87, 88, 92, 451/456

[56] References Cited

U.S. PATENT DOCUMENTS

| 777,201 | 12/1904 | Gutmann . |
| 864,471 | 8/1907 | Kelly . |
| 1,605,732 | 11/1926 | Hoevel . |
| 1,951,627 | 3/1934 | Peik . |
| 2,729,918 | 1/1956 | Van Denburgh . |
| 2,810,991 | 10/1957 | Mead . |
| 3,004,279 | 10/1961 | Ringer ..................... 451/92 |
| 3,073,070 | 1/1963 | Mead . |
| 3,407,538 | 10/1968 | Codina et al. . |
| 3,409,854 | 11/1968 | Swallert . |
| 3,777,834 | 12/1973 | Hiraoka et al. . |
| 3,877,175 | 4/1975 | Snyder ..................... 451/88 |
| 3,900,968 | 8/1975 | Shigyo . |
| 3,958,652 | 5/1976 | Urakami et al. . |
| 3,984,944 | 10/1976 | Maasberg et al. . |
| 4,010,346 | 3/1977 | Cecil et al. . |
| 4,029,164 | 6/1977 | Urakami et al. . |
| 4,149,345 | 4/1979 | Atsuchi . |
| 4,470,226 | 9/1984 | Williams . |
| 4,777,769 | 10/1988 | McLaughlin et al. . |
| 4,984,397 | 1/1991 | Van Leeuwen . |
| 4,993,200 | 2/1991 | Morioka et al. . |
| 5,056,275 | 10/1991 | Wada . |
| 5,195,800 | 1/1992 | Ruholl . |
| 5,195,280 | 3/1993 | Nicholson . |
| 5,216,844 | 6/1993 | Clack . |

FOREIGN PATENT DOCUMENTS

| 0367861 | 5/1990 | European Pat. Off. . |
| 59-42273 | 3/1984 | Japan . |
| 617161 | 2/1949 | United Kingdom . |
| 1437710 | 6/1976 | United Kingdom . |
| 2158378 | 11/1985 | United Kingdom . |
| 83/03071 | 9/1983 | WIPO . |

*Primary Examiner*—Jack W. Lavinder

[57] ABSTRACT

A floor surface blasting apparatus is used for removing rustproof coating (blasting) on a tank bottom surface to inspect weld lines on the bottom surface of high-capacity fuel tank. The floor surface blasting apparatus comprises a work arm which has weld line detecting sensors for detecting a weld line at the tip end and also has a blast head incorporating a suction nozzle; a work carriage which has the work arm and magnet devices incorporating a magnetic substance and travels arbitrarily on the floor surface; a transfer carriage which has a blast device for supplying blasting material to the blast head and travels arbitrarily on the floor surface; and a control device which controls the blast head so that the blast head is positioned on a weld line in accordance with the detection signal from the weld line detecting sensors and the signal of a position detecting device for detecting the position of the blast head and also makes the transfer carriage follow the work carriage.

20 Claims, 28 Drawing Sheets

F I G. 17(A)
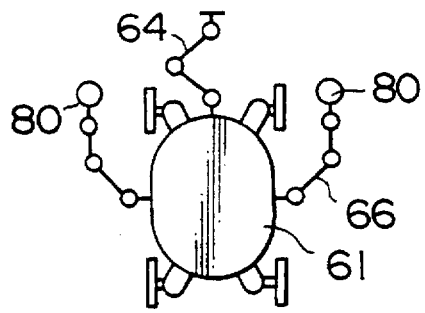
F I G. 17(B)
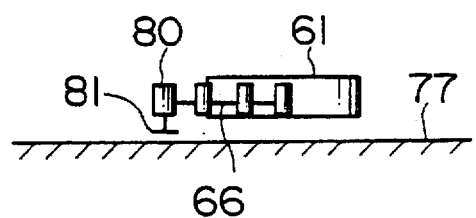
F I G. 18(A)
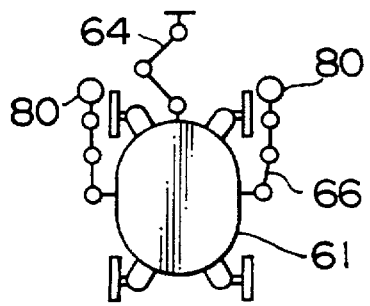
F I G. 18(B)
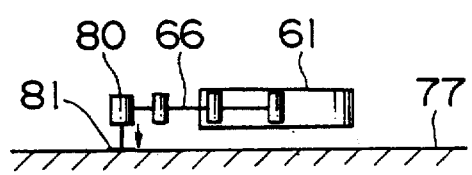
F I G. 19(A)
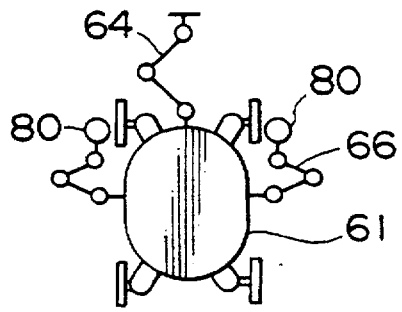
F I G. 19(B)
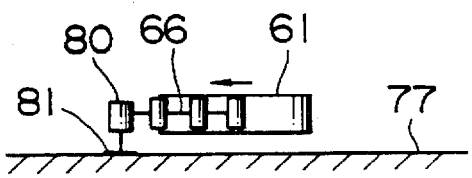

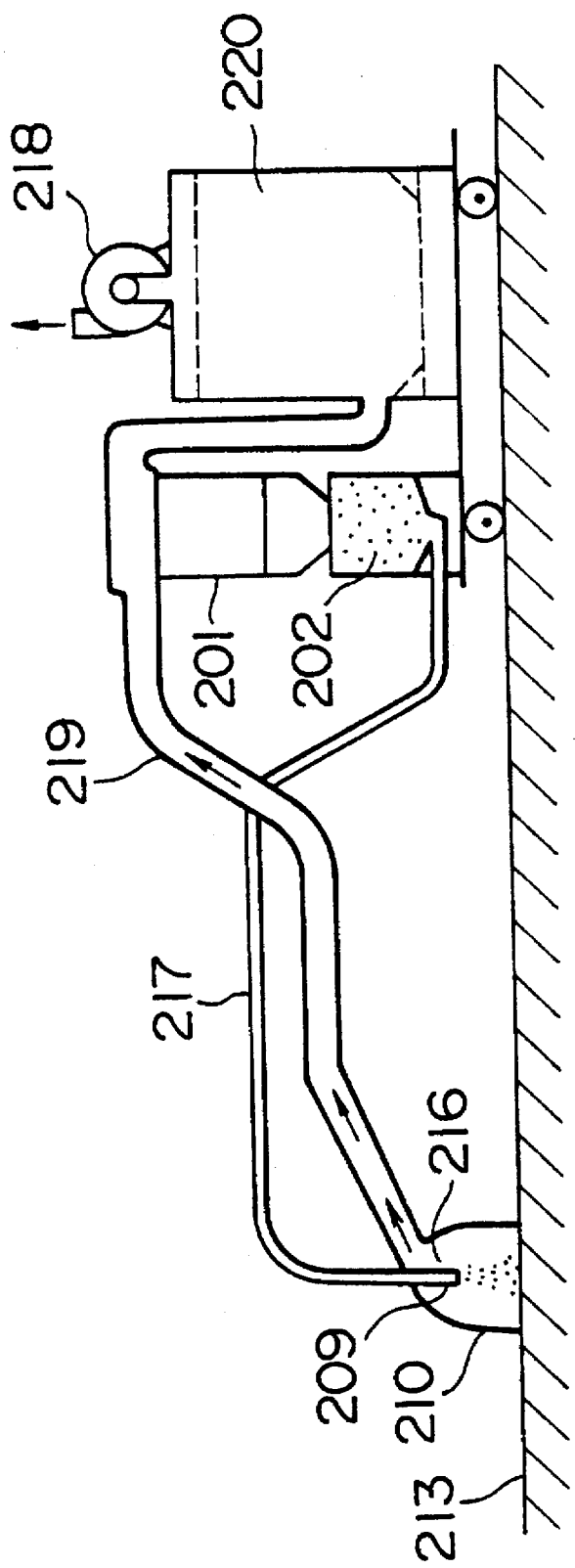

F I G. 35
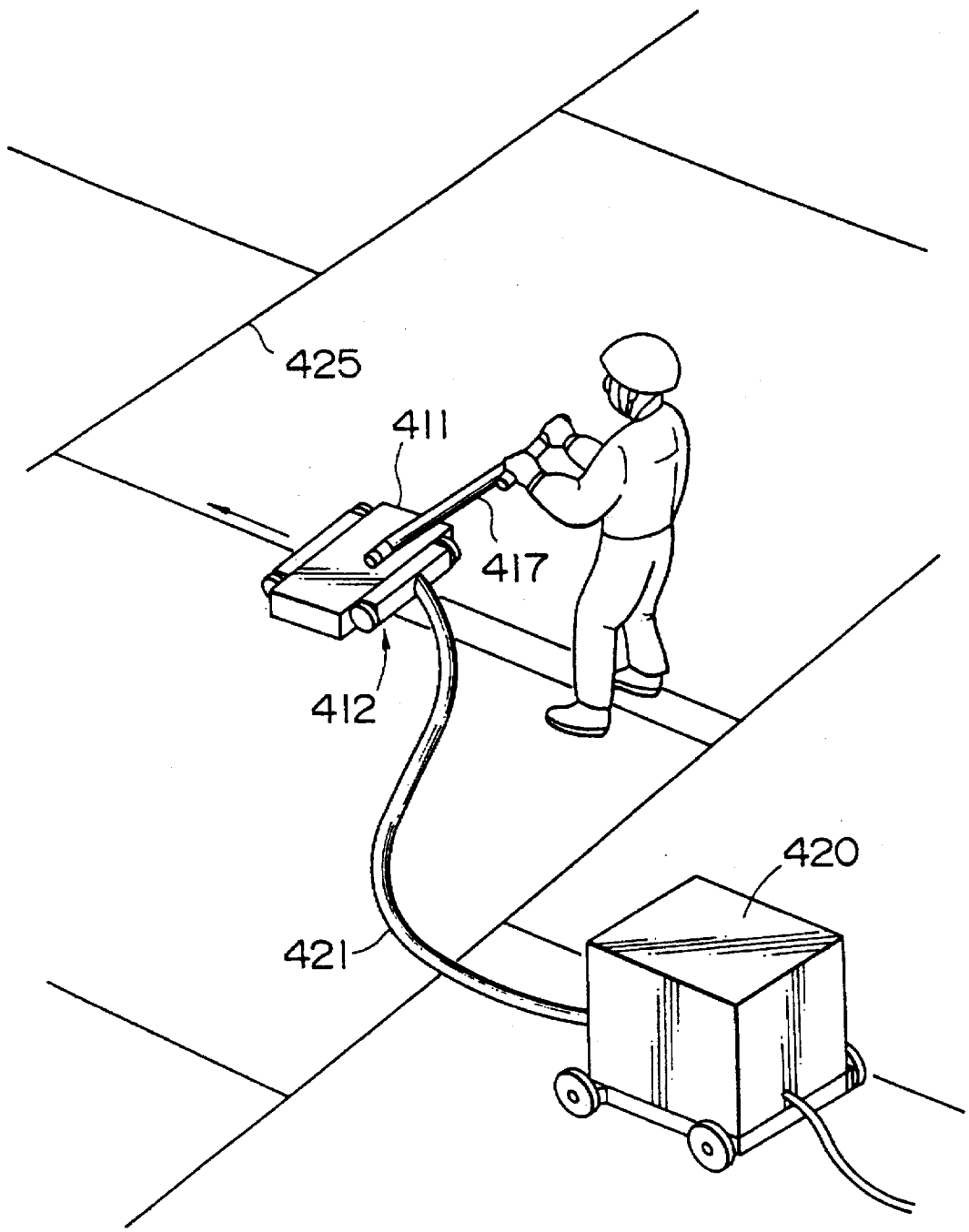

FLOOR SURFACE BLASTING APPARATUS

This application is a divisional of application Ser. No. 08/182,235, filed on Jan. 18, 1994, now U.S. Pat. No. 5,435,773, which was a divisional of application Ser. No. 07/935,179, filed on Aug. 26, 1992, now U.S. Pat. No. 5,339,573, the entire contents of which are hereby incorporated by reference.

FIELD OF THE INVENTION AND RELATED ART STATEMENT

The present invention relates to a floor surface blasting apparatus used for the inspection of, for example, the fuel tank bottom surface. More particularly, it relates to a floor surface blasting apparatus which performs the floor surface blasting operation for the inspection of the welded portions on the bottom surface of a large fuel tank.

High-volume fuel tanks installed in thermal power plants are obliged to be subjected to periodic checks every 5 or 10 years in accordance with the Fire Service Law. To inspect the weld line on the bottom surface, the coating must be removed. So far, workers entered the tank and performed the blasting operation.

FIG. 36 shows the conventional blasting operation.

In this figure, heaters b for heating the fuel, supports c, and posts d are installed on the bottom surface of a fuel tank (hereinafter abbreviated to a tank) a. A worker e performs blasting work with a blast head f being held by hands in on-off operation while avoiding the obstacles. The blast head f supplies particles from a blasting apparatus g, but does not recover the particles in almost all cases. The power cable and air pipe to the blasting apparatus runs through a manhole h.

FIG. 37 shows a conventional blasting apparatus in use. As shown in FIG. 37, the conventional blasting apparatus is constructed so that the blast head f having a blast nozzle (not shown) has a T-shaped operation handle i. To this blast head is connected a blasting apparatus body 1 having wheels k for moving via a supply/recovery hose j for blast particles.

The blasting operation was performed by a worker e walking while pushing the blast head f by hands along the weld line m on the bottom surface of a large fuel tank a.

The conventional blasting operation presented the following problems:
(1) Dust produced by the blasting operation and obstacles such as heaters b, supports c, and posts d aggravate the work environment, and make continuous work difficult.
(2) The work efficiency is poor because the work is done by workers.
(3) Safety measures for workers e must be taken because the work is done in a tank a.

Also, the above-described conventional blasting apparatus presented the following problems:
(1) Because the blast head f is moved manually by a worker e during the blasting operation, the blast head must be made compact, which restricts the blasting effect.
(2) Because the blast head f is moved manually by a worker e, much labor of worker e is required, which decreases the work efficiency.

OBJECT AND SUMMARY OF THE INVENTION

The present invention is aimed at solving these problems. An object of the present invention is to provide a floor surface blasting apparatus which performs blasting operation in a full automation mode in a predetermined pattern range after initial setting, and offers high blast effect and work efficiency.

Another object of the present invention is to provide a floor surface blasting apparatus which rapidly transfers the blasting material in a recovery tank to a pressure tank, prevents the leakage of dust, and performs uniform blasting, so that it has a high operation rate, high efficiency and is good for the health.

A further object of the present invention is to provide a highly efficient floor surface blasting apparatus which successively recovers almost all amounts of blasting material and dust leaking outside from a blast head, and prevents the leakage of blasting material and dust even when the floor surface is not flat and has a level difference.

To this end, the floor surface blasting apparatus comprises a work arm which has weld line detecting sensors for detecting a weld line at the tip end and also has a blast head incorporating a suction nozzle; a work carriage which has the work arm and magnet devices incorporating a magnetic substance and travels arbitrarily on the floor surface; a transfer carriage which has a blast device for supplying blasting material to the blast head and travels arbitrarily on the floor surface; and control means which controls the blast head so that the blast head is positioned on a weld line in accordance with the detection signal from the weld line detecting sensors and the signal of a position detecting device for detecting the position of the blast head and also makes the transfer carriage follow the work carriage.

To attain the above object, the floor surface blasting apparatus comprises a work carriage having a steering-type traveling device which drives four wheels independently; magnet devices which are installed on the work carriage and have a magnetic substance which controls the pushing force against the floor surface; a work arm installed on the work carriage; a blast head installed at the tip end of the work arm; weld line detecting sensors which are mounted on the blast head and detect a weld line; a position detecting device for detecting the position of the blast head; a transfer carriage which has a blast device and a steering-type traveling device for driving four wheels independently; connecting means for connecting the transfer carriage to the work carriage; and control means which controls the blast head so that the blast head is positioned on a weld line in accordance with the detection signal from the weld line detecting sensors and the signal of a position detecting device for detecting the position of the blast head and also makes the transfer carriage follow the work carriage.

To attain the above object, the floor surface blasting apparatus comprises a magnet portion which is installed on the body of the work carriage moving on a surface and movable close to or apart from the surface; an energizing member for energizing the magnet portion in the direction apart from the surface; position detecting means for detecting the position of the magnet portion; and magnet portion driving means which moves the magnet portion so that a predetermined clearance between the magnetic substance surface and the magnet portion is maintained in accordance with the signal of the position detecting means.

To attain the above object, a floor surface blasting apparatus comprises a magnet portion which is installed on the body of a work carriage moving on a surface and movable close to or apart from the surface; attracting force detecting means for detecting an attracting force of the magnet portion applied to the surface; magnet portion driving means which moves the magnetic portion so that a predetermined attracting force of the magnet portion applied to the surface is maintained in accordance with the signal of the attracting force detecting means.

To attain the above object, a floor surface blasting apparatus comprises a pressure tank for injecting blasting material from a blast nozzle; a recovery tank which is disposed above the pressure tank via a gate valve to temporarily store the recovered blasting material; an air bypass pipe connecting the pressure tank to the recovery tank; an opening/closing valve installed in the air bypass pipe; and blasting material outlet lines which are installed in the pressure tank and connected to a plurality of blast nozzles.

To attain the above object, a floor surface blasting apparatus comprises a blast head which incorporates a suction nozzle for recovering blasting material and dust produced by blasting; and a single or a plurality of auxiliary suction nozzles which are installed at the periphery of the blast head and recover the material and dust leaking outside from the lower end of the blast head.

To attain the above object, a floor surface blasting apparatus comprises a blast head having at least one blast nozzle; a traveling device installed on the blast head; an operation handle installed to the blast head; switches which are mounted on the operation handle and operate the traveling device and the blast head; a movable blasting apparatus body; and a connecting hose for connecting the blast head to the movable blasting apparatus body.

The operation of the floor surface blasting apparatus will be described. The work carriage is controlled by the control means so that the blast head is positioned on a weld line in accordance with the signals from the weld line detecting sensor and the position detecting device. The transfer carriage is controlled by the control means so that the transfer carriage follows the work carriage. The work carriage and the transfer carriage are moved in an arbitrary direction by the steering-type traveling device. On the work carriage, the attracting force against the floor surface is controlled by the operation of the magnetic substance of the magnet device. The particles awe supplied from the blast device to the blast head via the connecting means.

The operation of the floor surface blasting apparatus will be described. When there are irregularities on the surface, the distance between the surface and the magnet portion changes, and in turn the attracting force of the magnet portion changes. The distance between the surface and the magnet portion or the attracting force of the magnet portion with respect to the predetermined distance or attracting force is detected by the position detecting means or the attracting force detecting means. In accordance with this signal, the magnet portion driving means is controlled to bring the magnet portion close to or apart from the surface, so that a constant pushing force is always maintained.

The operation of the floor surface blasting apparatus will be described. The upper space of the recovery tank is connected to the upper space of the pressure tank through the air bypass pipe having the valve. By opening the valve, the pressurized air in the pressure tank is directed to the recovery tank. This enables rapid equalization of internal pressures of the two tanks as compared with the conventional method of releasing high-pressure air in the pressure tank into the atmosphere, so that the shifting of blasting material from the recovery tank to the pressure tank can be performed in a short time. The high-pressure air in the pressure tank is allowed to flow to the recovery tank, and it is not discharged directly into the atmosphere; therefore, a filter is unnecessary.

The lower portion of the pressure tank is transversely divided into a plurality of sections, a control valve is mounted at the outlet of blasting material for each section to control the supply of blasting material, and each section is connected to the blast nozzle via a blast hose, by which two or mope blast nozzles can be used with one pressure tank.

The operation of the floor surface blasting apparatus will be described. The blasting apparatus is provided with the auxiliary suction nozzle to recover the dust leaking outside from the blast head. To increase the recovery percentage, leaked blasting material and dust can be pushed toward the auxiliary suction nozzle by using a compressed air injection nozzle. The auxiliary suction nozzle is branched from the suction nozzle in the blast head, or it is connected to a separate suction device to recover the remaining dust.

The size and number of the suction nozzle and injection nozzle are determined as appropriate depending on the surface shape and size of the work. When a relatively large level difference lies for example as shogun in FIG. 32, an independent auxiliary suction nozzle is installed at the right and left part of the level difference each, by which an approximately constant distance between the auxiliary suction nozzle and the work surface can be maintained. This prevents a great decrease in the force to suck the dust on the work surface.

When it is difficult to sufficiently recover the remaining dust by the auxiliary suction nozzle only due to the shape and size of work, the remaining dust is recovered by pushing the remaining dust toward the auxiliary suction nozzle with compressed air injected from the compressed air injection nozzle.

The operation of the floor surface blasting apparatus will be described. An operator holds the operation handle and operates the switch for traveling device to move the blast head by the traveling device and to turn it. At the same time, the operation of the switch for operating the blast head discharges particles from the blast nozzle and recovers it for blasting operation.

The above constitution of the present invention offers the following effects:

According to the floor surface blasting apparatus, the blasting operation can be performed continuously in a full automation mode within the predetermined range after initial setting. Therefore, workers go to the floor surface only for initial setting, maintenance, and disassembly and removal of the apparatus after the completion of blasting operation. This significantly shortens the work time and improves the work environment.

According to the floor surface blasting apparatus, the magnet device is provided with the magnet portion, which can be brought close to or apart from the surface, and the magnet portion driving means, which moves the magnet portion in accordance with the signal of the position detecting means or the attracting force detecting means, so that the position of the work carriage with respect to the magnetic surface can be always kept constant independently of the shape of the surface by moving the magnet portion by using the magnet portion driving means in such a manner that a predetermined clearance between the magnet portion and the surface is maintained. Thus, the work carriage can be pushed against the surface with a predetermined constant force. As a result, the slippage of the wheels of the work carriage is prevented, and the work carriage can be moved on a predetermined course. The work efficiency is thereby increased and the work carriage can be made compact and lightweight.

According to the floor surface blasting apparatus, the apparatus comprises a pressure tank for injecting blasting material from a blast nozzle; a recovery tank which is disposed above the pressure tank via a gate valve to temporarily store the recovered blasting material; an air bypass pipe connecting the pressure tank to the recovery tank; an opening/closing valve installed in the air bypass pipe; and blasting material outlet lines which are installed in the pressure tank and connected to a plurality of blast nozzles. Therefore, the blasting material in the recovery tank is rapidly shifted to the pressure tank. This floor surface blasting apparatus prevents the leakage of dust, and performs uniform blasting, so that it has a high operation rate, high efficiency and is good for the health.

According to the floor surface blasting apparatus, almost all amounts of dust produced by blasting can be recovered immediately after the dust is produced, and the apparatus can be used for blasting of a surface having a level difference, so that the following effects can be offered.

(1) Since almost all amounts of blasting material can be recovered and reused, blasting material can be used effectively, and the number of change and replenishment of blasting material can be significantly reduced, which enables continuous blasting operation for a long time.

(2) Since almost all amounts of dust can be recovered immediately after blasting, damage to a work such as a painted surface due to the dust can be prevented.

In effect, according to the floor surface blasting, the apparatus comprises a blast head which incorporates a suction nozzle for recovering blasting material and dust produced by blasting; and a single or a plurality of auxiliary suction nozzles, which are installed at the periphery of the blast head and recover the blasting material and dust leaking outside from time lower end of the blast head. Therefore, a highly efficient floor surface blasting apparatus can be provided which successively recovers almost all amounts of blasting material and dust leaking outside from a blast head, and prevents the leakage of blasting material and dust even when the floor surface is not flat and has a level difference.

According to the floor surface blasting apparatus, the traveling device is installed to the blast head having at least one blast nozzle, the operation handle mounted to the blast head has switches for operating the traveling device and the blast head is connected to the movable blasting apparatus body. Therefore, the blasting effect can be increased by using a large-diameter nozzle or multiple nozzles or a large blast head. Also, an operator merely traces the weld line while holding the operation handle, which significantly reduces labor and increases the work efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 18(A) and 18(B) are views illustrating a plan view and side view, respectively, of the operation of an auxiliary arm, FIGS. 19(A) and 19(B) are views illustrating a plan view and side view, respectively, of the operation of an auxiliary arm, FIG. 24 is a schematic view of a suction-type floor surface blast head device, FIG. 35 is a perspective view showing the use of a blasting apparatus.

DETAILED DESCRIPTION OF PREFERRED EMBODIMENTS

An embodiment of the present invention will be described with reference to FIGS. 1 through 13.

Figure 1:
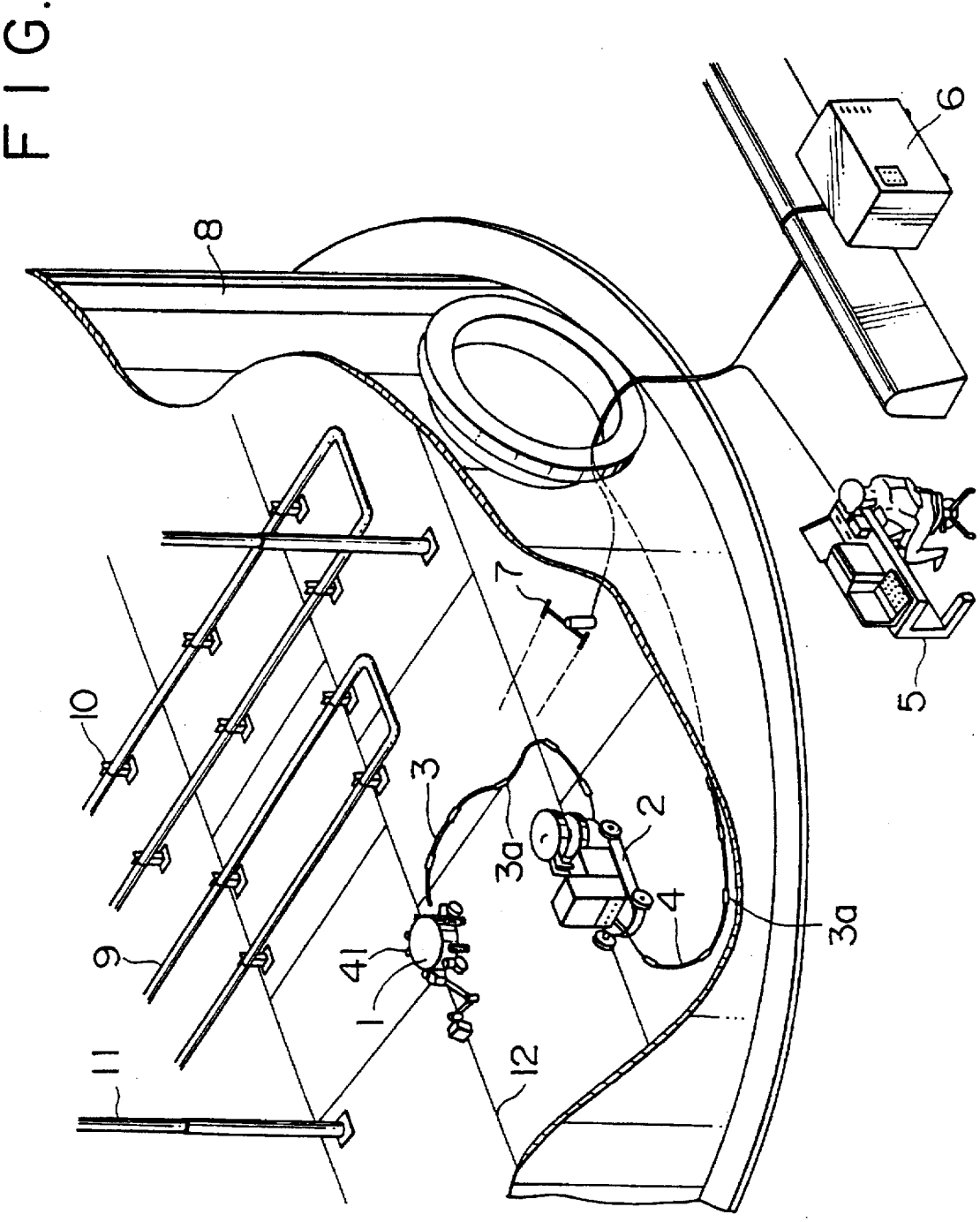
FIG. 1 is a schematic view showing a system of floor surface blasting apparatus.
Figure 2:
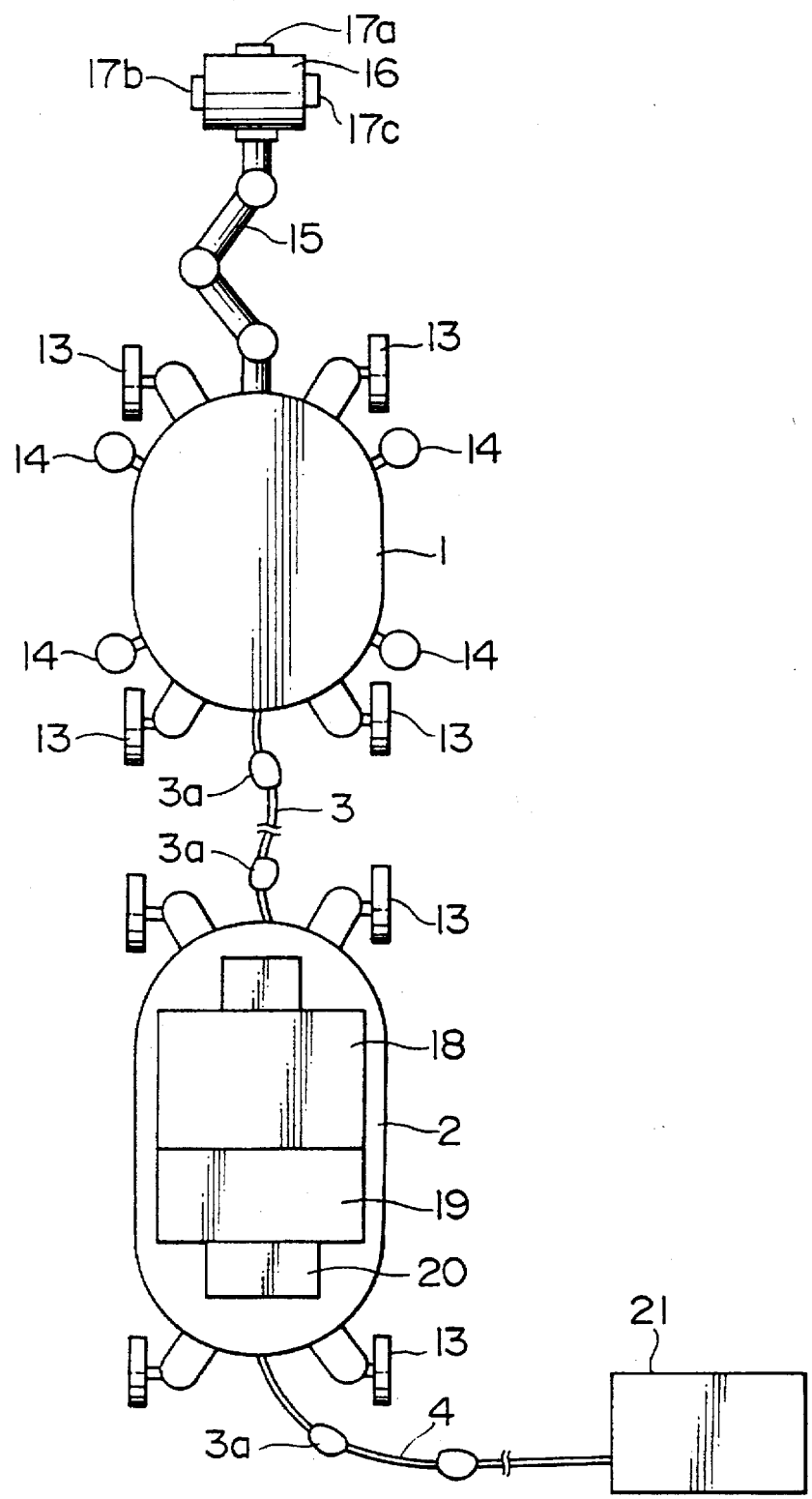
FIG. 2 is a plan view of a movable portion of the apparatus.
Figure 3:
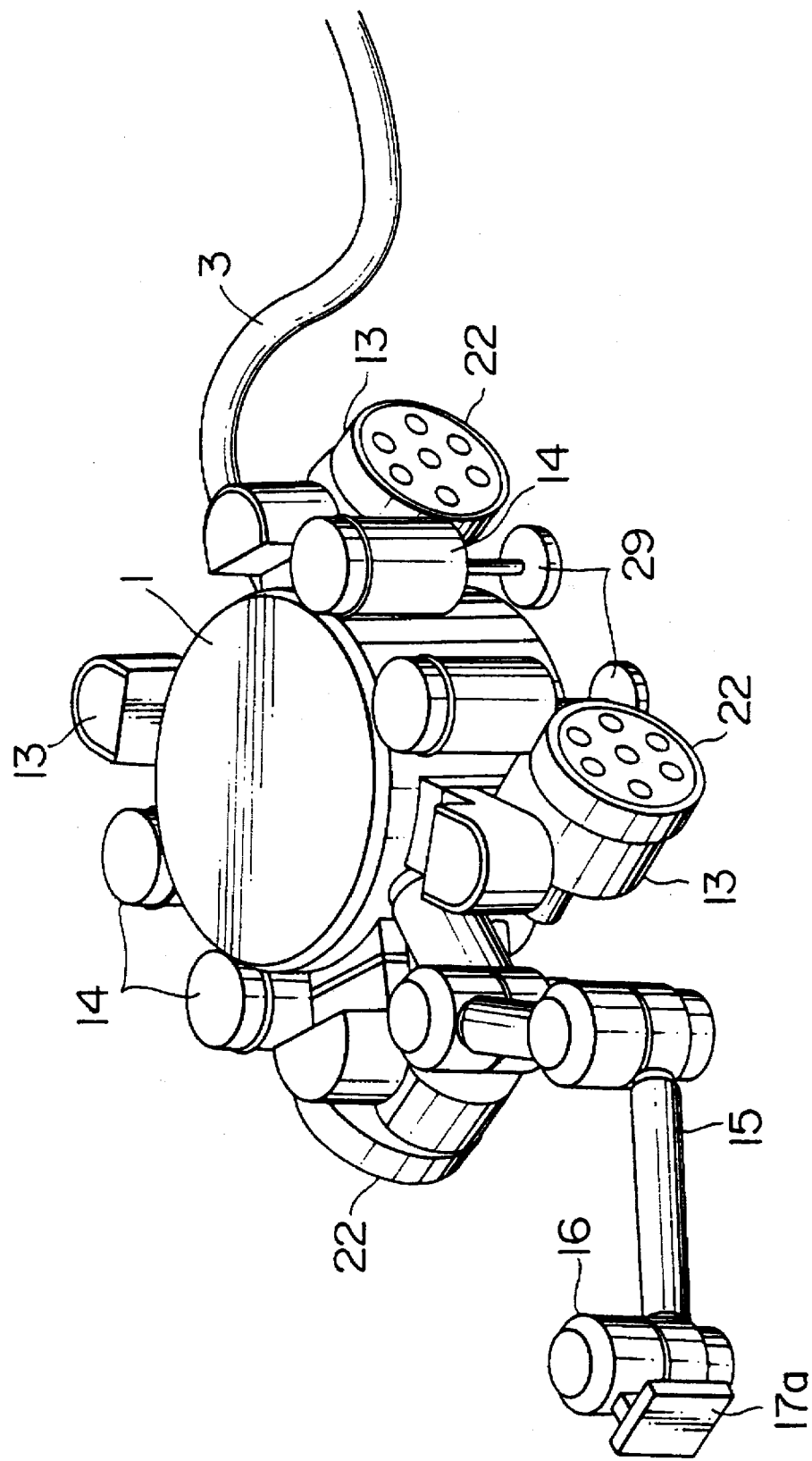
FIG. 3 is a perspective view of a work carriage.
Figure 4:
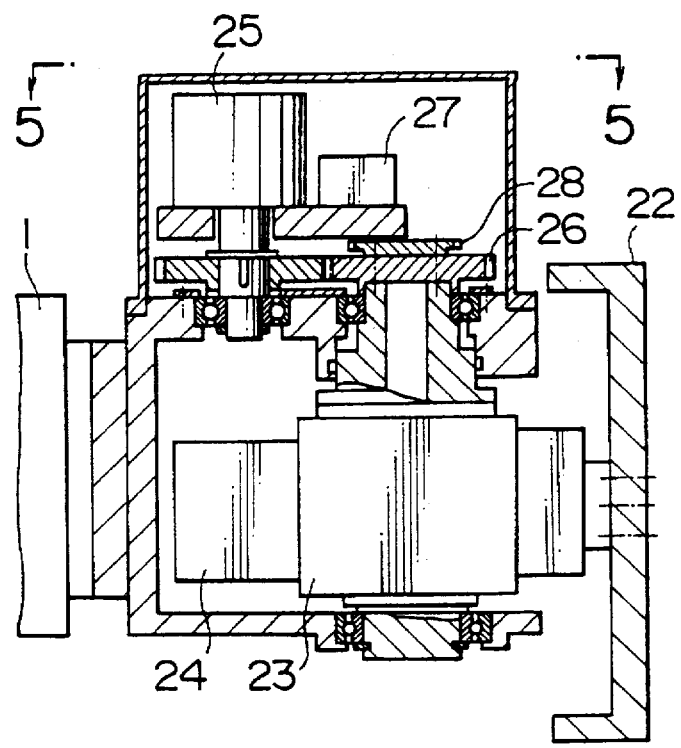
FIG. 4 is a sectional view of a drive wheel device for the work carriage.
Figure 5:
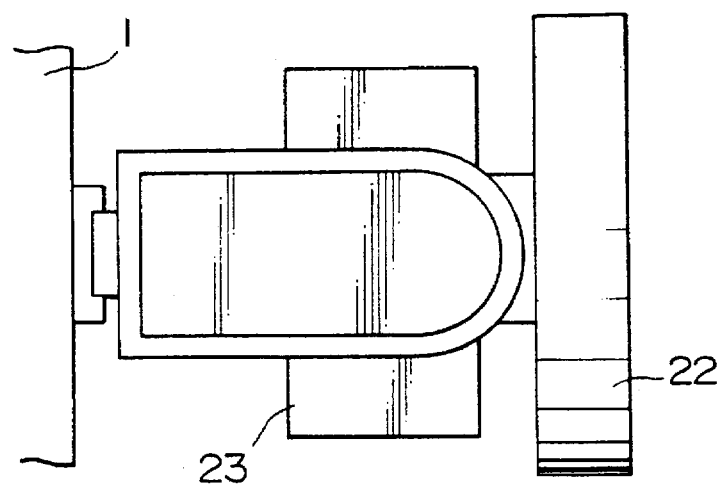
FIG. 5 is a plan view of a drive wheel device for the work carriage viewed from line 5—5 of FIG. 4.
Figure 6:
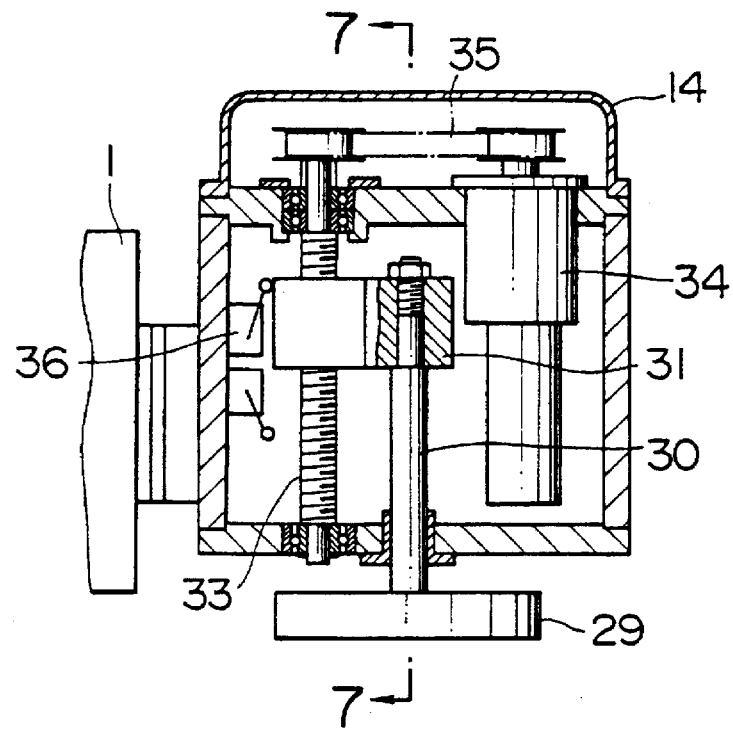
FIG. 6 is a sectional view of a magnet device of the work carriage.
Figure 7:
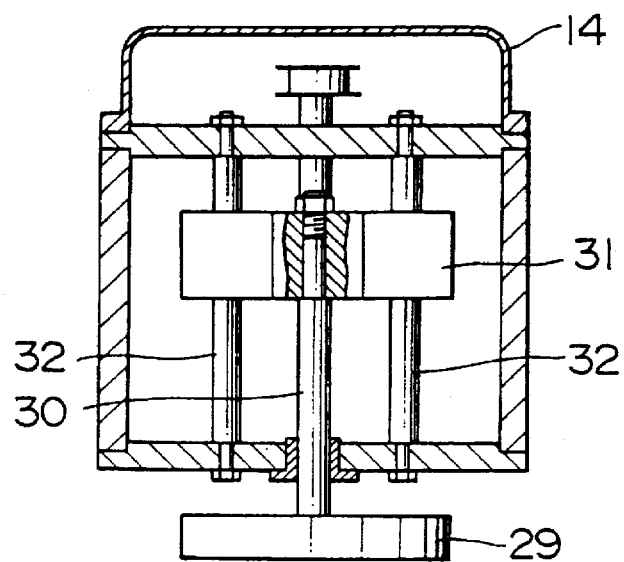
FIG. 7 is a sectional view taken on the plane of the line 7—7 of FIG. 6, FIGS. 8(A)–8(G) are views showing the steering operation.
Figure 8A:
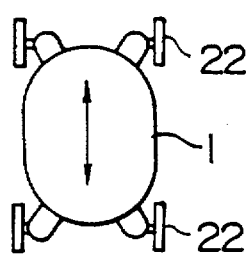
Figure 8B:
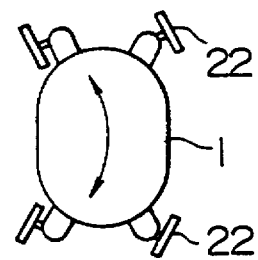
Figure 8C:
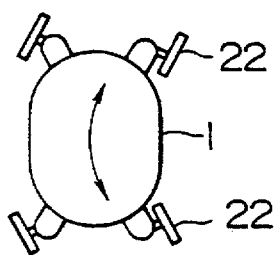
Figure 8D:
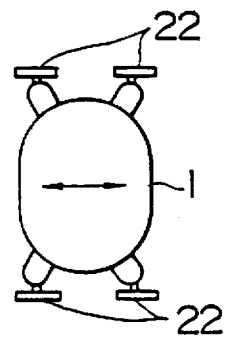
Figure 8E:
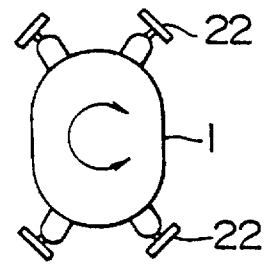
Figure 8F:
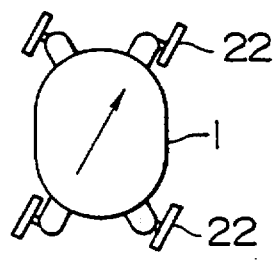
Figure 8G:
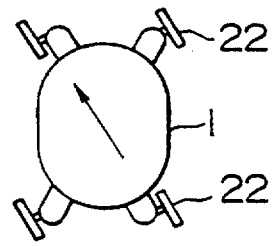
Figure 9:
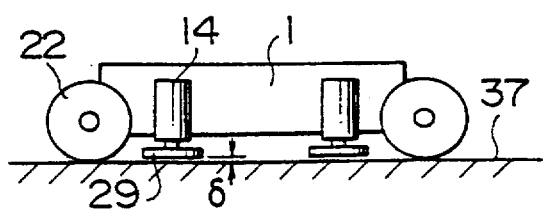
FIG. 9 is a view showing the action of the magnet.
Figure 10:
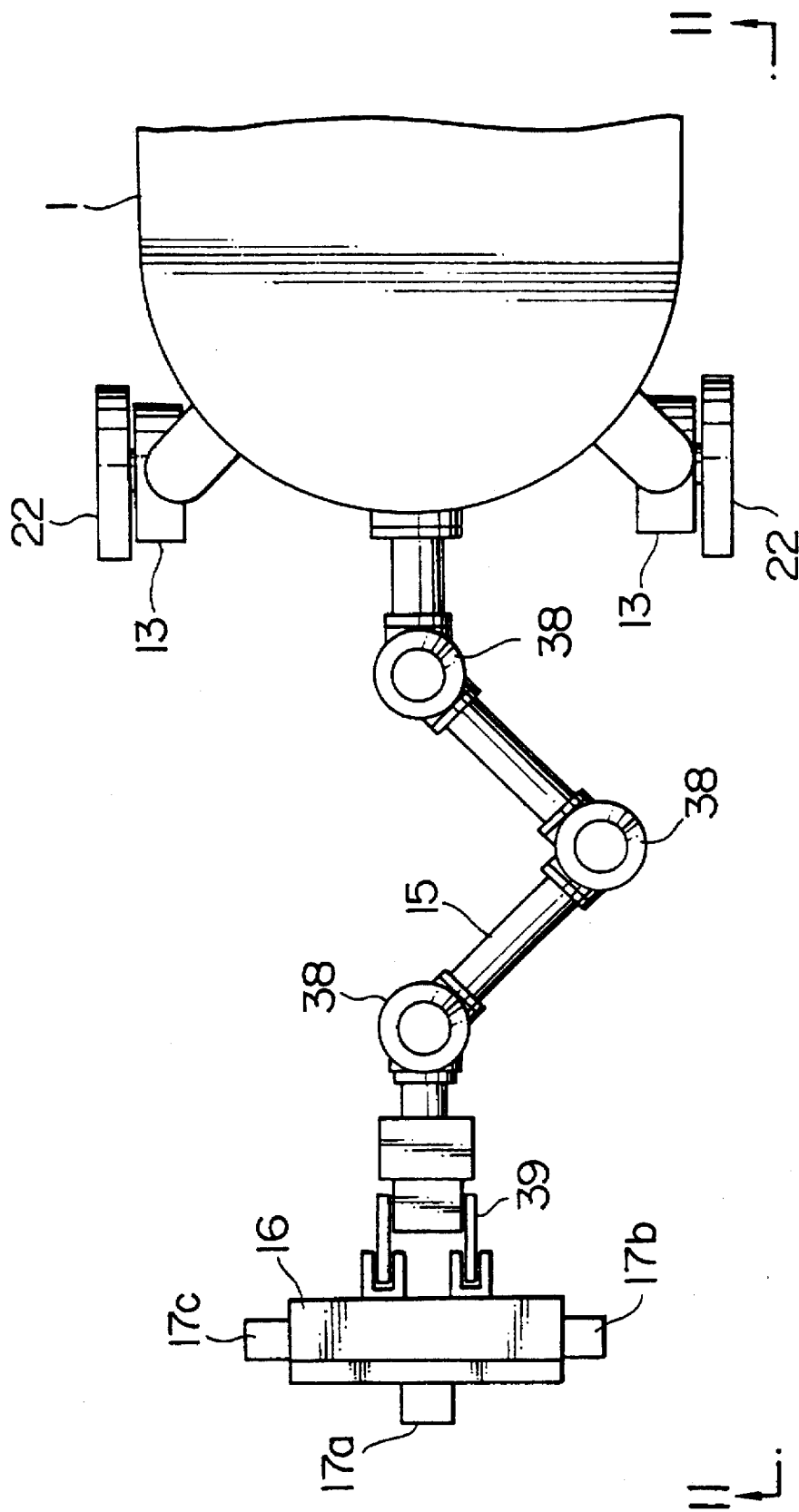
FIG. 10 is a plan view of a work arm and a blast head.
Figure 11:
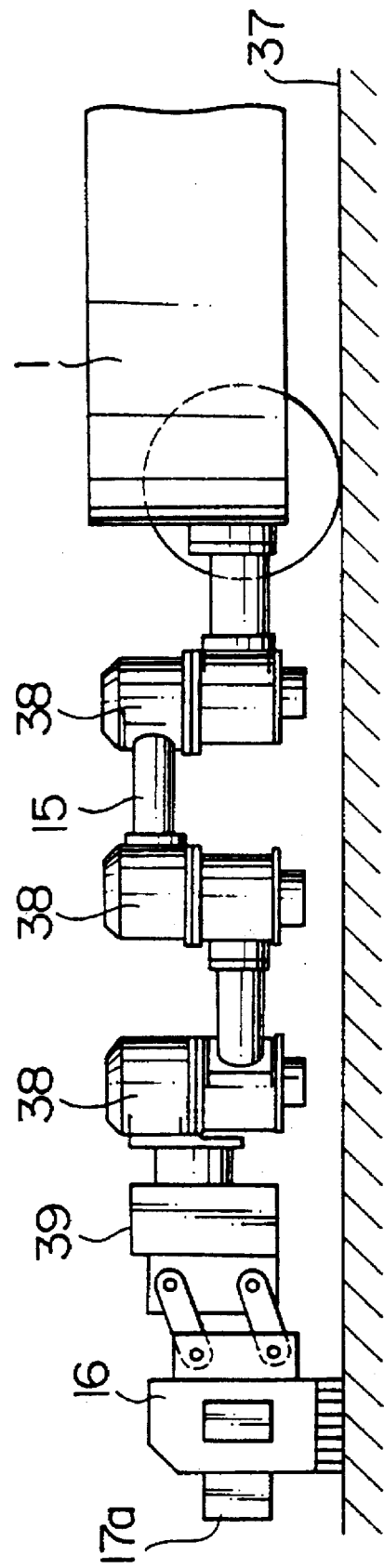
FIG. 11 is a side view of a work arm and a blast head viewed from line 11—11 of FIG. 10.
Figure 12:
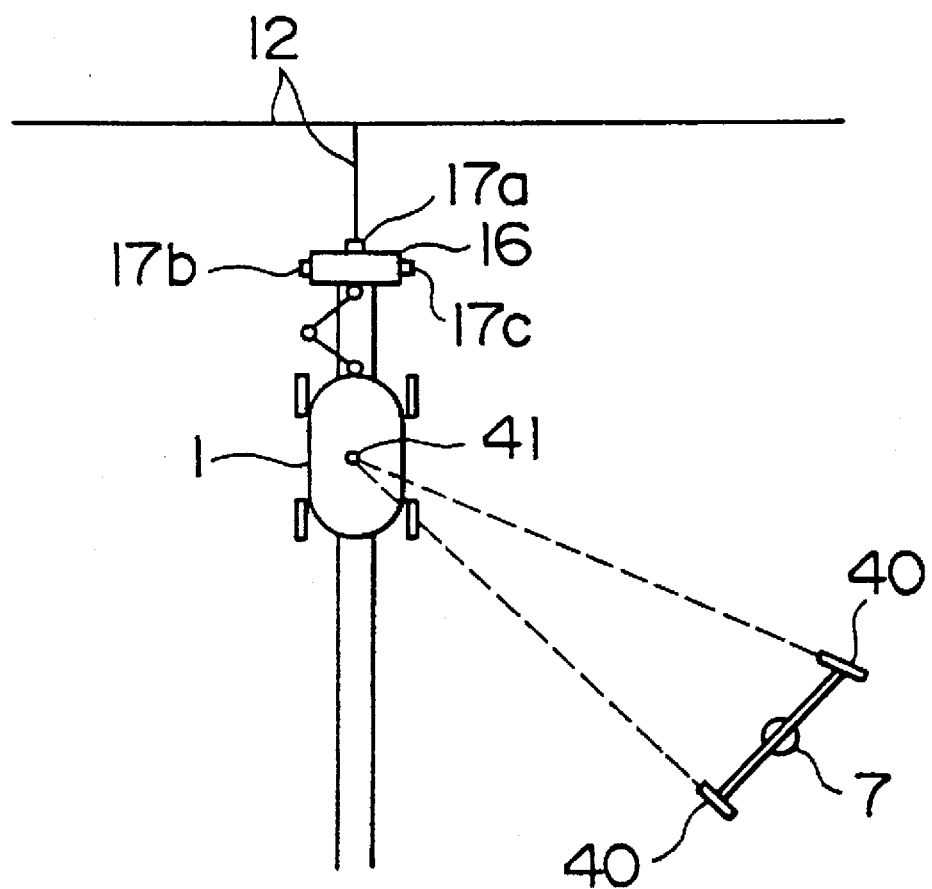
FIG. 12 is a view illustrating a position detecting device.

FIG. 1 is a schematic view showing a system of floor surface blasting apparatus including peripheral devices, FIG. 2 is a plan view of a movable portion of the apparatus, FIG. 3 is a perspective view of a work carriage, FIGS. 4 and 5 are views illustrating a drive wheel device for the work carriage, FIGS. 6 and 7 are views illustrating a magnet device of the work carriage, FIGS. 8(A)–8(G) are views showing the steering operation, FIG. 9 is a view showing the action of the magnet, FIGS. 10 and 11 are views illustrating a work arm and a blast head, FIG. 12 is a view illustrating a position detecting device, and FIGS. 13(A)–13(D) are views illustrating a weld line detecting sensor.

Referring to FIG. 1, this apparatus comprises a work carriage 1, a transfer carriage 2, an intermediate hose 3 for connecting the carriages a supply hose 4, a console 5 as a control unit, a compressed air source 6, and a position detecting device 7. The work carriage 1, the transfer carriage 2, and the intermediate hose 3 are called a movable portion. The intermediate hose 3 and the supply hose 4 are provided with sliding members 3a (for example, Teflon material) at appropriate positions to prevent damage to the coating of the floor surface caused by the hoses being dragged when the work carriage 1 and the transfer carriage 2 move. On the floor surface of a tank 8, heaters 9 for heating the fuel, supports 10 therefor, and posts 11 are installed. The work carriage 1 performs blasting operation of weld line 12 while avoiding these obstacles.

The console 5 is provided with a computer, a display, a recording device and so on. The weld lines 12, the pattern of heater 9, and the positions of supports and posts are stored in the computer. For a large tank, the weld line pattern is appropriately divided and stored to facilitate the control. The position detecting device 7 observes a light source 41 installed on an antenna of the work carriage 1 with two TV cameras and sends signals to the console 5 to show the carriage position on the display.

On the console 5, a work course is determined from the displayed weld line pattern and sends signals to the work carriage 1. The transfer carriage 2 follows the work carriage 1 by using signals sent from the console 5 to prevent the intermediate hose from being taut.

Referring to FIG. 2, the work carriage 1 has four sets of drive wheel devices 13 which are used as a steerable traveling device having a steering mechanism and a drive mechanism as shown in FIG. 3. In front of the work carriage 1, a work arm 15 is installed. At the tip end of the work arm, a blast head 16 is installed. The blast head 16 has weld line detecting sensors 17a, 17b, 17c, each at the front, left, and right. In the intermediate hose 3, an electrical cable, a blast supply hose, and a blast recovery hose are incorporated, though not illustrated in the figure.

On the transfer carriage 2, a blast device 18, an electrical box 19, and remote control box 20 are mounted. The transfer carriage 2 supplies blasting material to the work carriage 1 and recovers it therefrom as well as serves as the center of the remote control. It has four sets of drive wheel devices 13, which is the same as that of the work carriage 1 and remotely controlled in accordance with the movement of the work carriage under the command from the controller 21 of the console 5 (FIG. 1).

Referring to FIGS. 4 and 5, FIG. 4 is a sectional view of the drive wheel device 13, and FIG. 5 is a plan view thereof. In FIG. 4, the wheel 22 is driven by a motor 24 in a motor case 23. In the motor case 23, a reduction gear and an encoder 27 are incorporated. The direction of motor case is changed by a steering motor 25 via a gear 26. The encoder 27 is connected to a gear 28.

Referring to FIGS. 6 and 7, FIG. 6 is a sectional view of the magnet device 14, and FIG. 7 is a sectional view taken on the plane of the line 7—7 of FIG. 6. In FIG. 6, a magnet 29 as a magnetic substance is installed to an elevating shaft 30 and moves up or down together with a ball screw block 31. The ball screw block 31 is moved up or down along the guide shafts 32 by a ball screw shaft 33 as shown in FIG. 7. The ball screw shaft 33 is driven by a motor 34 via a belt 35. On the inside of the case of magnet device 14, limit switches 36 are installed to define the upper and lower limits of the ball screw block 31.

Referring to FIGS. 8(A)–8(G), movement of the work carriage 1 in accordance with the direction of wheel 22 is indicated by the arrows. In FIG. 8(A) straight travel is denoted. FIG. 8(b) denotes a left turn, FIG. 8(C) denotes a right turn, FIG. 8(D) denotes traverse travel, and FIG. 8(E) denotes rotation. When all the wheels 22 are in the same direction, oblique motion can be performed as shown in FIG. 8(F) and FIG. 8(G). By combining these motions, the work carriage can be moved freely on the floor surface. Since the transfer carriage 2 also has the same drive wheel device 13 as that of the work carriage 1 as described above (FIG. 2), the same motion patterns are obtained for the transfer carriage 2.

Referring to FIG. 9, the magnet device 14 installed on the work carriage 1 can move the magnet 29 arbitrarily as explained by referring to FIGS. 6 and 7. Therefore, the force to push the work carriage 1 against the floor surface 37 can be controlled by adjusting the clearance δ between the magnet 29 and the floor surface 37. Consequently, the magnet device 14 serves as a brake for the work carriage 1, and prevents slippage when the work carriage 1 travels on a floor surface contaminated by oil.

FIG. 10 is a plan view of the work arm portion, and FIG. 11 is a side view thereof. The work arm is of three articulation 38 type. Each articulation incorporates a motor and is controlled independently. At the tip end of the work arm 15, a blast head 16 is installed via a vertical moving device 39 so that the clearance between the blast head 16 and the floor surface 37 is properly maintained.

Figure 13A:
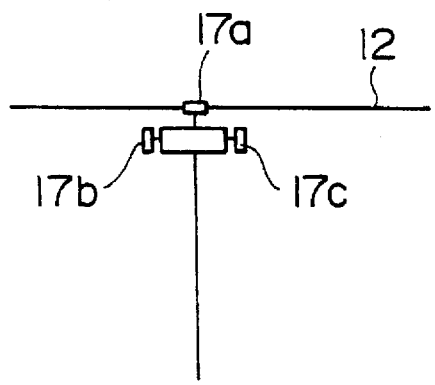
FIGS. 13(A)–13(D) are views illustrating a weld line detecting sensor.

Referring to FIG. 12, a command is issued automatically from the console shown in FIG. 1 to the work carriage 1 and the work arm 15 so that the weld line detecting sensor (hereinafter called the sensor) 17a detects the weld line to be blasted and the blast head travels on that weld line. The position of the work carriage 1 is determined by tracing the light source on the work carriage 1 by using two TV cameras 40 installed on the position detecting device 7, and displayed on the monitor TV screen on the console 5. FIGS. 13(A), (B), (C), and (D) show an example of the change of direction.

In FIG. 13(A), the sensor 17a reaches an intersection of weld lines and the blasting operation is stopped.

Figure 13B:
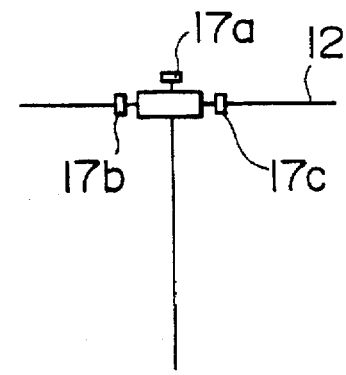

When the sensors 17b, 17c reach the weld line 12 as shown in FIG. 13(b), the work carriage 1 stops.

Figure 13C:
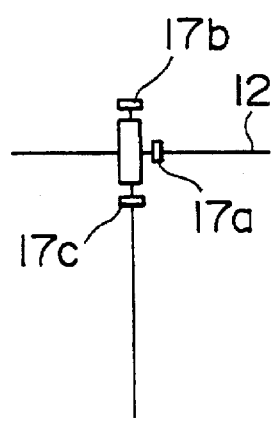
Figure 13D:
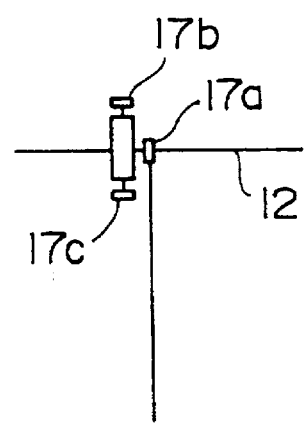

In FIG. 13(c) blast head 16 turns (clockwise in this case) in accordance with the travel pattern which has been established in advance by means of the computer. The blast head 16 in FIG. 13(D) moves back to a point where the sensor 17a comes to the intersection of weld lines, and then the blast head moves forward while blasting.

When the sensor 17a encounters the next intersection of weld lines, the above procedures are repeated.

The work carriage described above offers the following effects:

(1) Straight motion, rotation, turning, and oblique motion can be effected by changing the direction of a pair of drive wheel devices installed at the front and the rear because of four-wheel drive steering system.
(2) The blasting work can be done in a confined area owing to the flexible work arm 15.
(3) The pushing force of the work carriage 1 against the tank bottom surface can be adjusted owing to the vertically movable magnet device 14, by which the slippage of wheel can be prevented and the carriage can be fixed.
(4) Remote control can be carried out from the outside of the tank by using a monitor device such as a TV camera via a cable assembly.

Although an example of the work carriage 1 which is used for blasting operation has been described above, the work carriage 1 of the above embodiment can be used for various kinds of operations.

Another embodiment of the work carriage will be described with reference to FIGS. 14 through 19.

Figure 14:
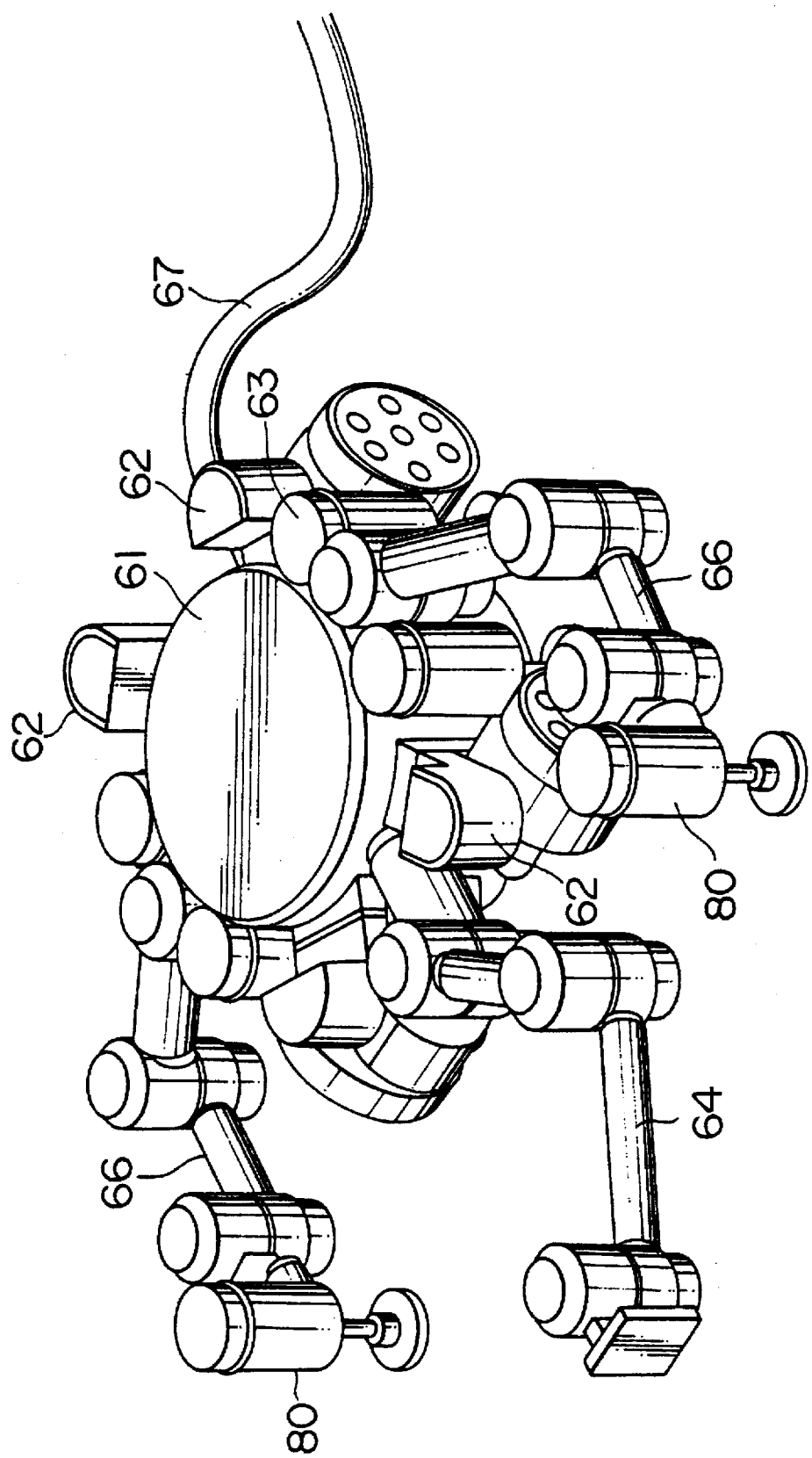
FIG. 14 is a perspective view of another embodiment of the work carriage.
Figure 15:
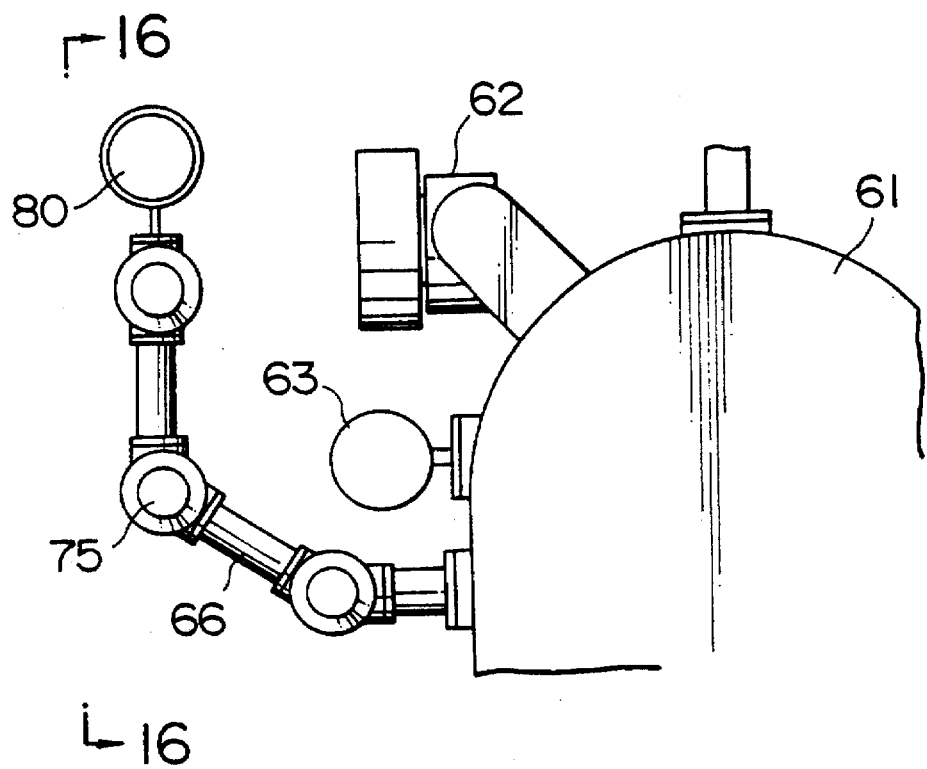
FIG. 15 is a plan view of an auxiliary arm.
Figure 16:
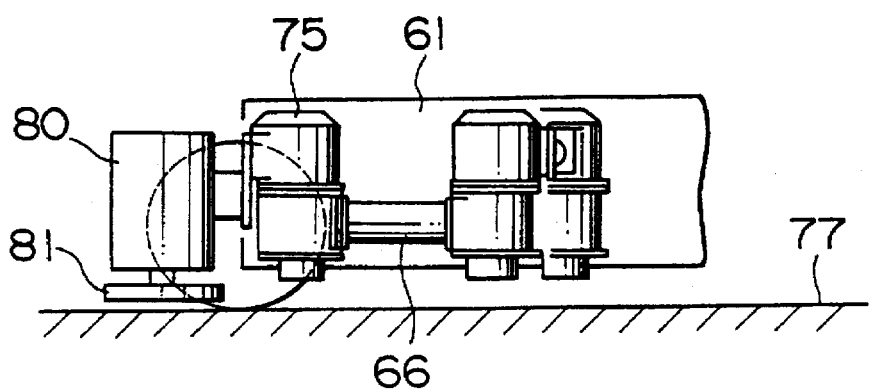
FIG. 16 is a side view of an auxiliary arm viewed from line 16—16 of FIG. 15, FIGS. 17(A) and 17(B) are views illustrating a plan view and side view, respectively, of the operation of an auxiliary arm.

FIG. 14 is a perspective view of another embodiment of the work carriage, FIGS. 15 and 16 are views illustrating an auxiliary arm, FIGS. 17(A) and (B), 18(A) and (B), and 19(A) and (B) are views illustrating the operation of an auxiliary arm.

Referring to FIG. 14, the work carriage 61 has four sets of drive wheel device 62 and four sets of magnet device 63 at its periphery. The work arm 64 is installed in front of the work carriage 61. At each side of the work carriage 61 one auxiliary arm 66 having a magnet device 80 is installed. A cable assembly 67 incorporates an air hose, a power cable, and a control cable.

FIG. 15 is a plan view of an auxiliary arm, and FIG. 16 is a side view thereof. In FIG. 15, the auxiliary arm 66 is, like the work arm 64, a three-articulation system having three articulations 75, and is fixed to each right and left side of work carriage 61. At the tip end of the auxiliary arm, the magnet device 80 is installed. The magnet device 80 is of a piston type, in which a magnet 81 (FIG. 16) is moved up or down. The auxiliary arm 66 is an auxiliary transfer means of the work carriage 61 which is a combination of the magnet device 80 and the articulation 75.

FIGS. 17, 18, and 19 show a walk sequence by using the auxiliary arm 66. FIGS. 17(A), 18(A), and 19(A) are plan views, and FIGS. 17(B), 18(B), and 19(B) are views.

FIGS. 17(a) and (b) shows the normal condition, in which the auxiliary arm is in an arbitrary position.

In FIGS. 18(A) and (B), the auxiliary arm 66 is fully extended, and the magnet device 80 is operated. The magnet 81 is brought into contact with the floor surface 77 and energized for fixing.

In FIGS. 19(A) and (B), the auxiliary arm 66 is retracted to advance the work carriage 61.

If the operation of the right and left auxiliary arm 66 is changed, the turning of the work carriage can be performed.

A level difference in the range of vertical movement of the magnet 81 can be gotten over by the above procedure.

The work carriage 61 of the above construction can be moved by using the auxiliary arm 66 even when the wheels cannot be used because of slippage.

As the above-mentioned magnet device 14, 63, 80, a magnet device of the embodiment shown in FIGS. 20 through 23 can be used, which will be described below.

As the blast head 16, a blast device of the embodiment shown in FIGS. 24 through 32 can be used.

These magnet device and blast device will be described below.

First, an embodiment of the present invention defined will be described with reference to FIGS. 20 through 23.

The present invention relates to the magnet device of the work carriage for the floor surface blasting apparatus.

Figure 20:
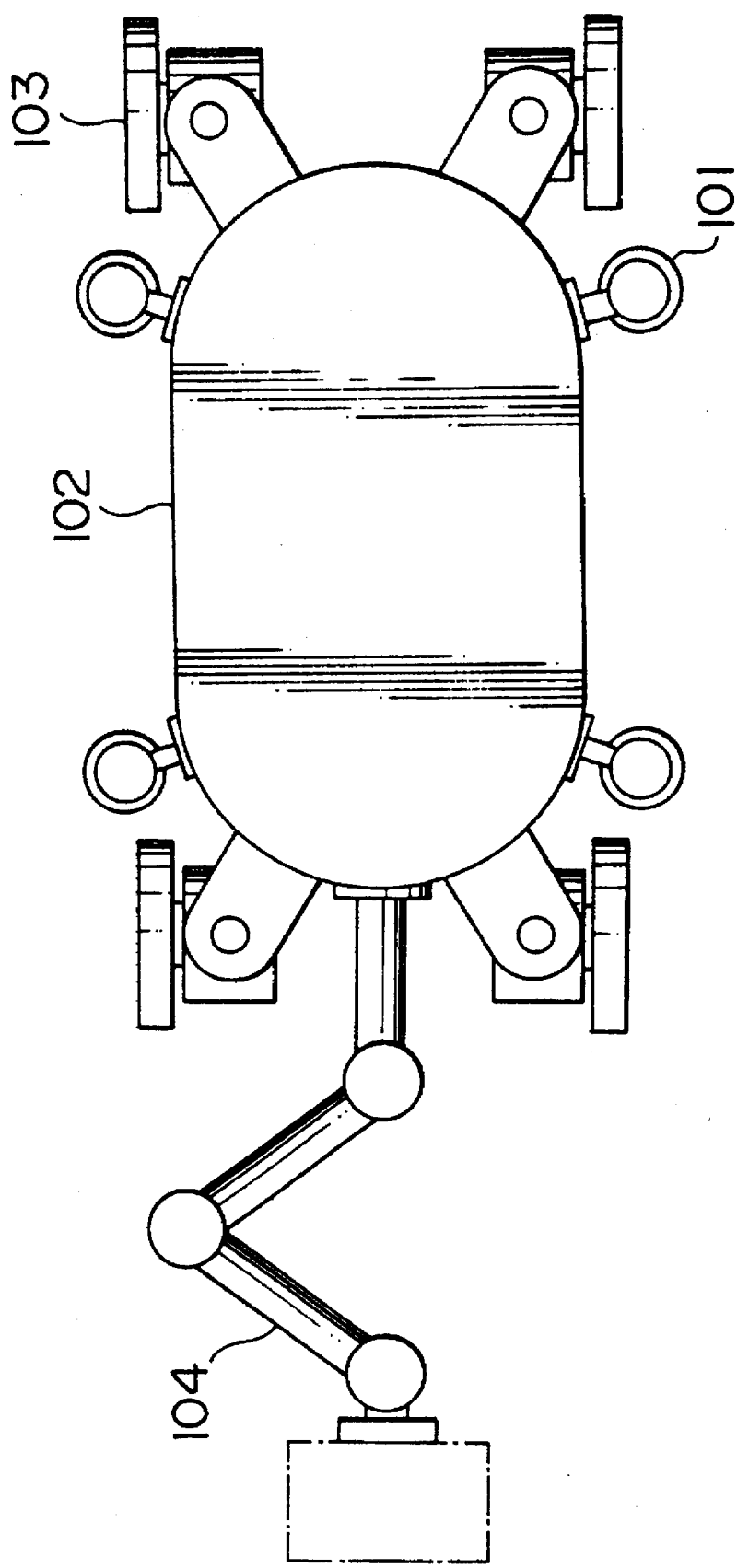
FIG. 20 is a schematic plan view of work carriage having a magnet device.
Figure 21:
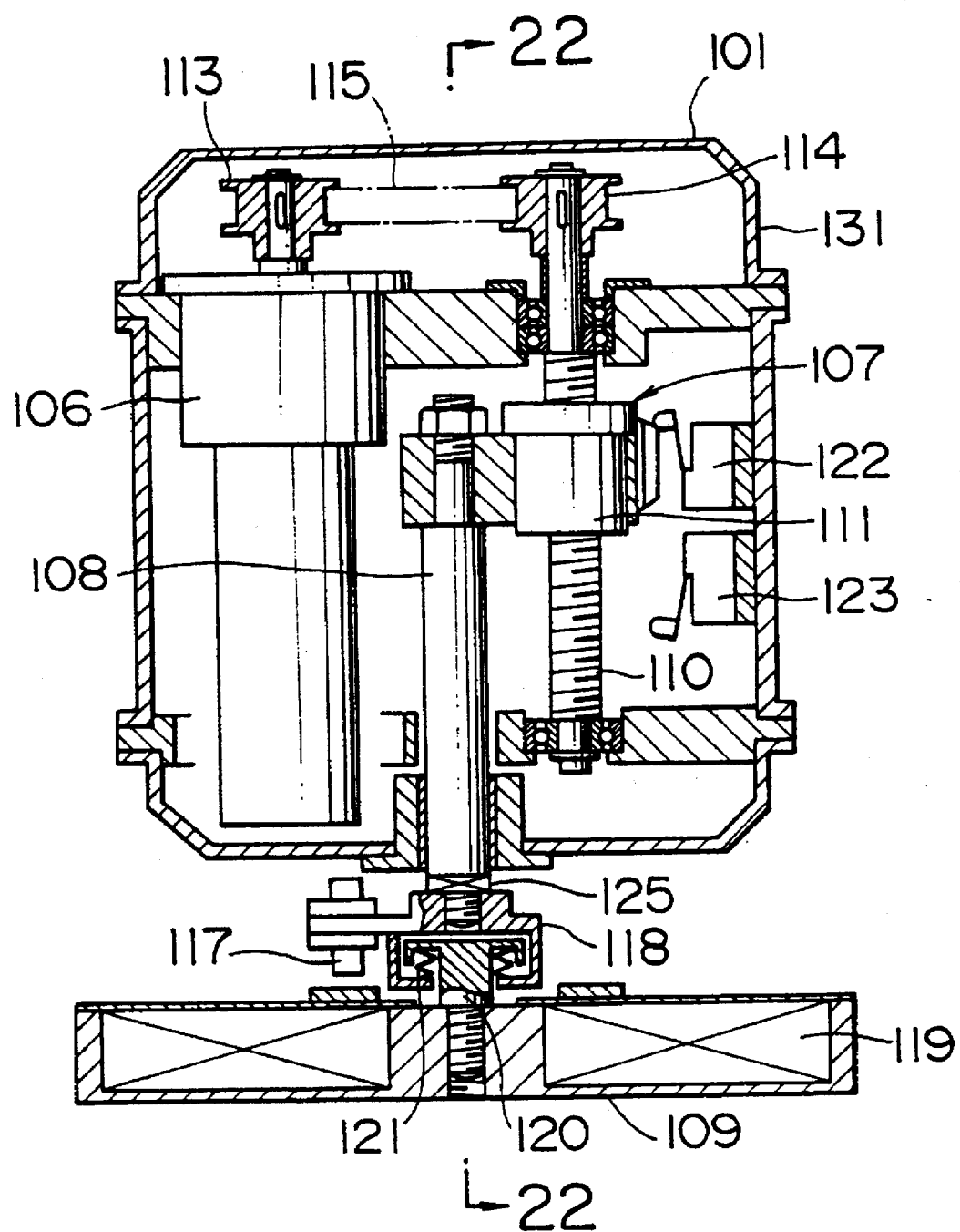
FIG. 21 is a sectional view of a magnet device.
Figure 22:
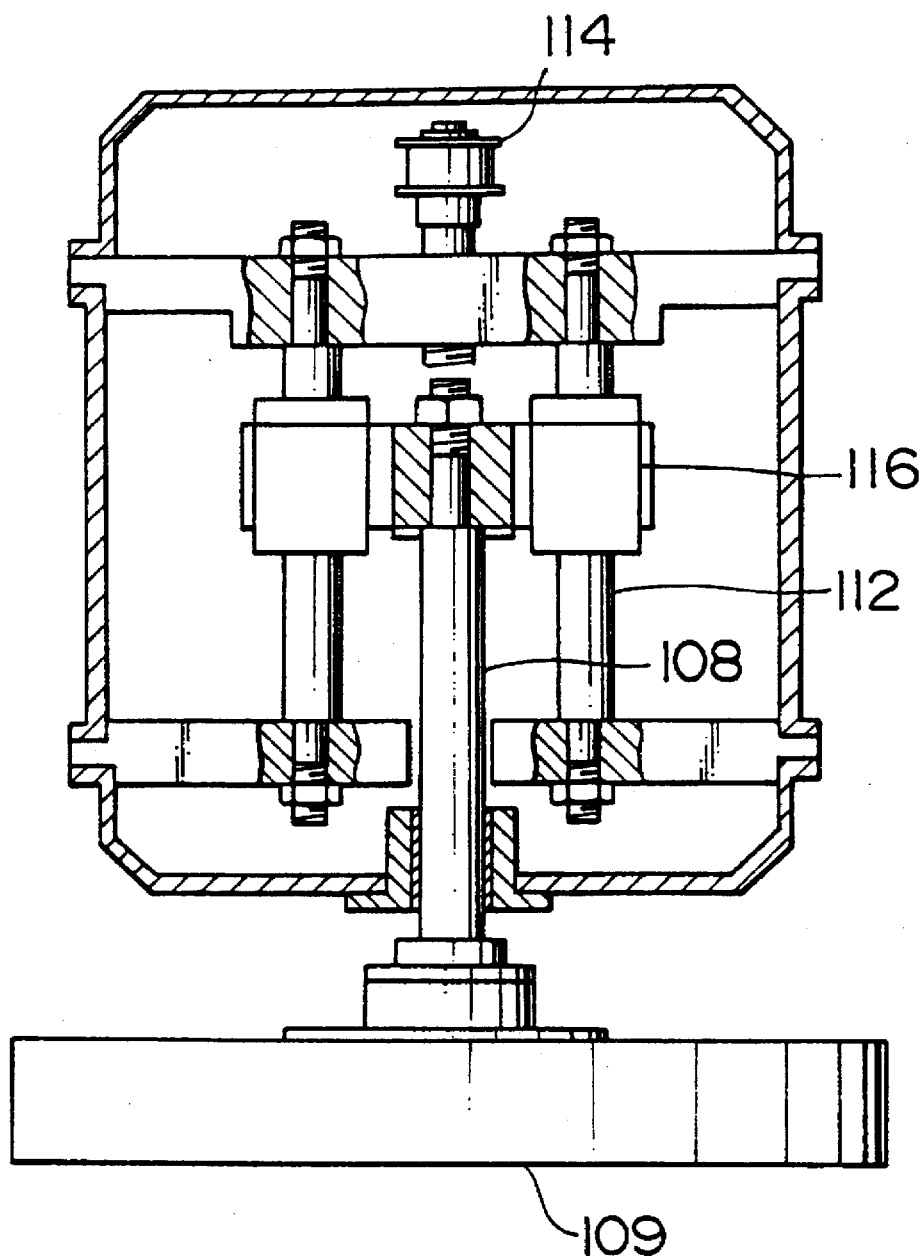
FIG. 22 is a sectional view taken on the plane of the line 22—22 of FIG. 21, FIGS. 23(A)–23(C) are views illustrating the operation of a magnet device.

FIG. 20 is a schematic plan view of work carriage having a magnet device used for the floor surface blasting apparatus of the present invention, FIG. 21 is a sectional view of the magnet device, and FIG. 22 is a sectional view taken on the plane of the line 22—22 of FIG. 21.

As shown in FIG. 20, the magnet device 101 is installed on the side surface of the work carriage 102. Adjacent to the magnet device 101, the drive wheel device 103 is installed on the work carriage 102. Each drive wheel device 103 has a drive section to perform turning and braking actions. The work carriage 102 is provided with a work arm mechanism 104 for tool operation.

The construction of the magnet device 101 will be described with reference to FIGS. 21 and 22. In the body 131 of the magnet device 101, an elevating shaft 108 is installed in such a manner that it can be moved up or down. At the lower end of the elevating shaft 108 is installed a flange 118, which has a distance sensor 117 as a position detecting means. The flange 118 has a leaf spring 121 as an energizing means, and the magnet portion 109 is supported in such a manner that it is energized upward (in the direction in which it leaves the floor surface 124 or the magnetic substance surface described later). The distance sensor 117 detects the position of the magnet portion 109. The magnet portion 109 incorporates a magnet 119.

Slide shafts 112 extending in parallel to the elevating shaft 108 are installed to the body 131, and a slide bearing 116 is slidably carried on the slide shafts 112. The slide bearing 116 is installed on the top of the elevating shaft 108 to guide the vertical movement of the elevating shaft 108.

A ball screw shaft 110 extending in parallel to the elevating shaft 108 is rotatively carried on the body 131, and a ball screw device 111 is screwed onto the ball screw shaft 110. The ball screw device 111 is fixed to the top of the elevating shaft 108, so that the elevating shaft 108 is moved up or down by the rotation of the ball screw shaft 110 via the ball screw device 111.

The body 131 is provided with a drive motor 106. The drive motor 106 is connected to the ball screw shaft 110 via pulleys 113, 114 and a timing belt 115, so that the ball screw shaft 110 is rotated in the normal or reverse direction by the operation of the drive motor 106. The drive motor is driven by a signal sent from the distance sensor 117. That is to say, a magnet portion driving means is composed of a slide mechanism 107 consisting of the drive motor 106, the ball screw shaft 110, and the ball screw device 111. In FIG. 21, reference numerals 122, 123 are limit switches for detecting the upper and lower limits of the ball screw device 111, respectively.

The operation of the magnet device 101 will be described with reference to FIG. 23. The views (A), (B), and (C) in FIG. 23 illustrate the operation of the magnet device 101.

Figure 23A:
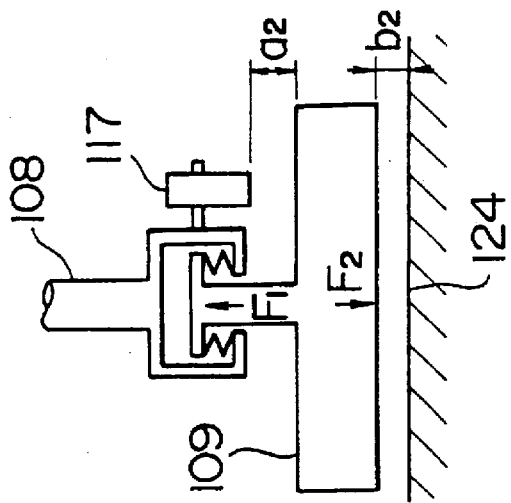
Figure 23B:
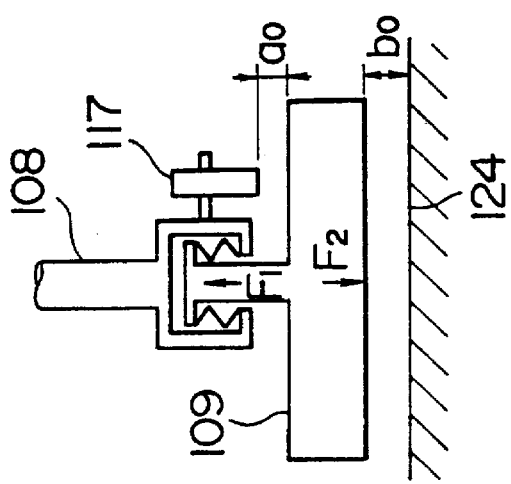

In the condition of FIG. 23(B), the signal of the distance sensor 117 agrees with the preset value, and the elevating shaft 108 is stationary. The clearance between the distance sensor 117 and the magnet portion 109 in this condition is taken as $a_0$, and the clearance between the magnet portion 109 and the floor surface 124 which is as $b_0$. The floor surface 124 is a magnetic substance surface i.e. the magnet portion 109 is attracted to the floor surface (26).

In the condition of FIG. 23(A), the floor surface 124 is farther apart from the magnet portion 109, and the clearance is $b_1$ ($b_1 > b_0$). The clearance between the distance sensor 117 and the magnet portion 109 is $a_1$ ($a_1 < a_0$). In this case, a drive command is issued to the drive motor 106 by the difference between the signal of distance sensor 117 and the preset value, so that the elevating shaft 108 is lowered via the slide mechanism 107. The drive motor 106 continues to run until the condition (B) is reached.

Figure 23C:
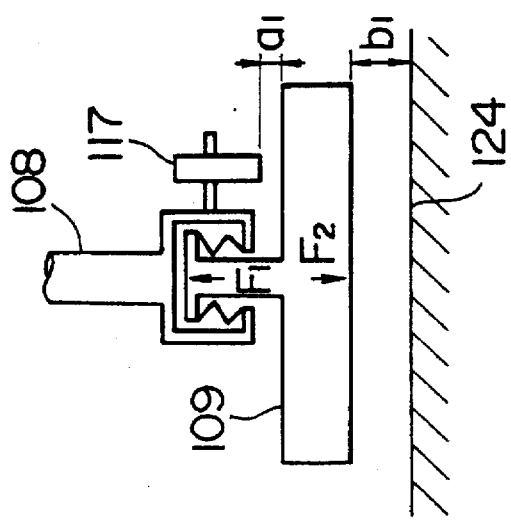

In the condition of FIG. 23(c) the magnet portion 109 comes closer to the floor surface 124, and the clearance is $b_2$ ($b_2 < b_0$). The clearance between the distance sensor 117 and the magnet portion 109 is $a_2$ ($a_2 > a_0$). In this case, a drive command for the reverse direction is issued to the drive motor 106 by the difference between the signal of distance sensor 117 and the preset value, so that the elevating shaft 108 is raised via the slide mechanism 107. The drive motor continues to run until the condition (B) is reached.

With the above-described magnet device 101, therefore, the clearance between the distance sensor 117 and the magnet portion 109 is kept constant by driving the drive motor 106 in accordance with the detection signal: in other words, the clearance between the body 131 of the work carriage 102 having the magnet devices 101 and the floor surface 124 can be kept constant independently of the shape of the floor surface 124.

The attracting force can be set freely by changing the intensity of the leaf spring 121 or the magnet 119, or by changing the supply power when the magnet 119 is an electromagnet. The attracting force can also be set by changing the preset value of the distance sensor 117.

As shown in FIG. 21, a force detecting sensor 125 may be installed between the lower end of the elevating shaft 108 and the flange 118 as a means for detecting the attracting force. The force detecting sensor 125 senses the change of attracting force of the magnet 119, and the drive motor 106 is driven in accordance with the detection signal to obtain a predetermined pushing force.

Next, still another embodiment of the present invention will be described with reference to FIGS. 24 through 32.

A wide variety of blasting apparatuses are used for surface cleaning or surface preparation of metals and other industrial materials depending on the material and size of the work. For relatively small blasting apparatuses used mainly at the work site, a suction-type blasting apparatus is often used.

FIGS. 24 through 28 show a suction-type floor surface blasting apparatus. In this floor surface blasting apparatus, as shown in FIG. 24, blasting material in a pressure tank 202 is supplied to a blast nozzle 209 together with high-pressure air through a blast hose 217, and injected onto the work surface 213 such as the floor surface of a fuel tank. The injected blasting material and fine particles (hereinafter called dust) removed from the surface of work 213 by the blasting material are carried through a suction port 216 installed in the blast head 210 and a recovery hose 219 by a blower 218. The blasting material is sucked into a recovery tank 201 and the dust is sucked into a dust collector 220.

In order to reuse the recovered blasting material in the recovery tank 201, the blasting operation being interrupted temporarily, a vertically movable gate valve, which divides the recovery tank 201 from the pressure tank 202, is lowered by releasing the air in the pressure tank 202 into the atmosphere so that the blasting material drops from the recovery tank 201 into the pressure tank 202.

Figure 25:
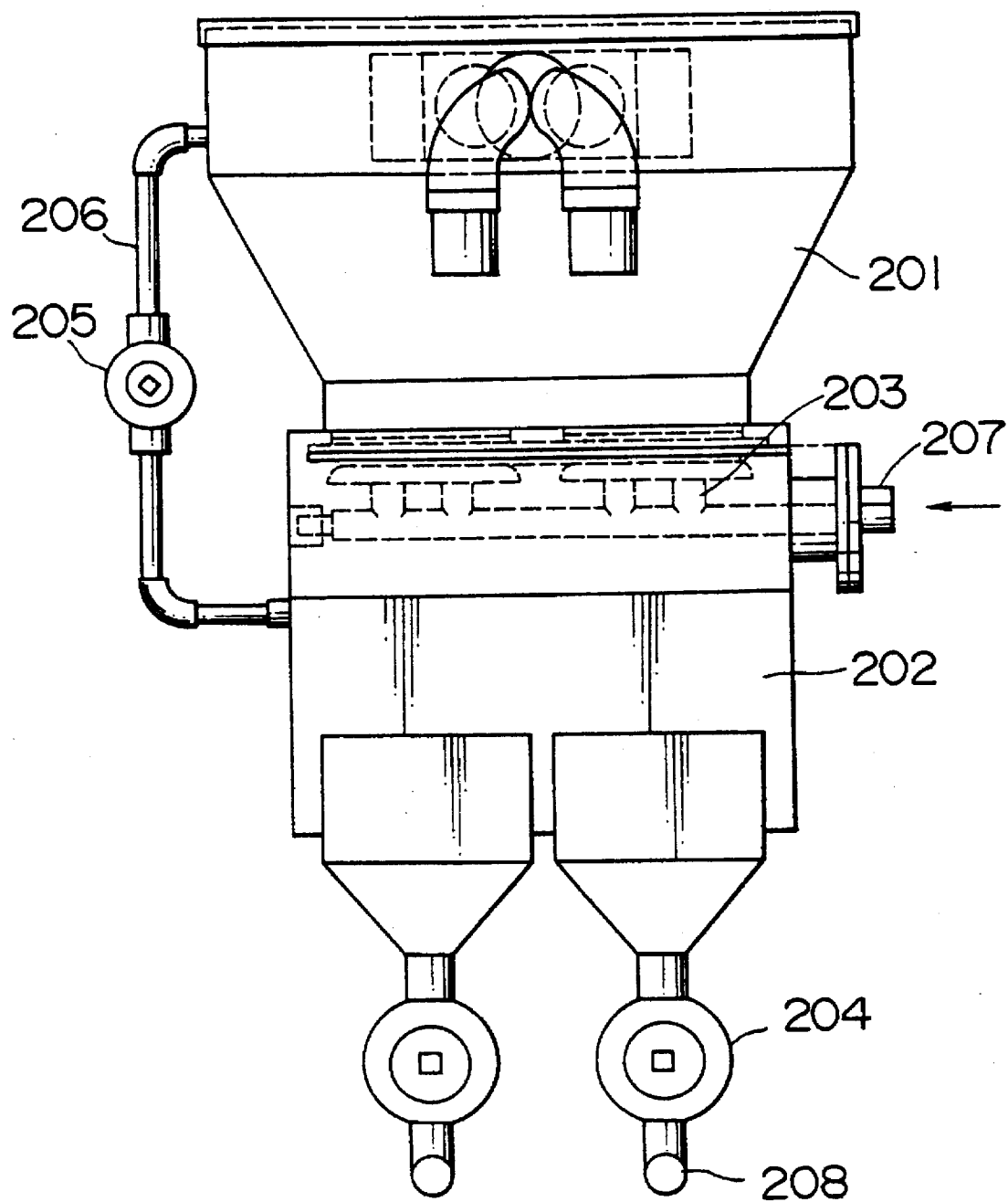
FIG. 25 is a front view of a recovery/pressure tank system.
Figure 26:
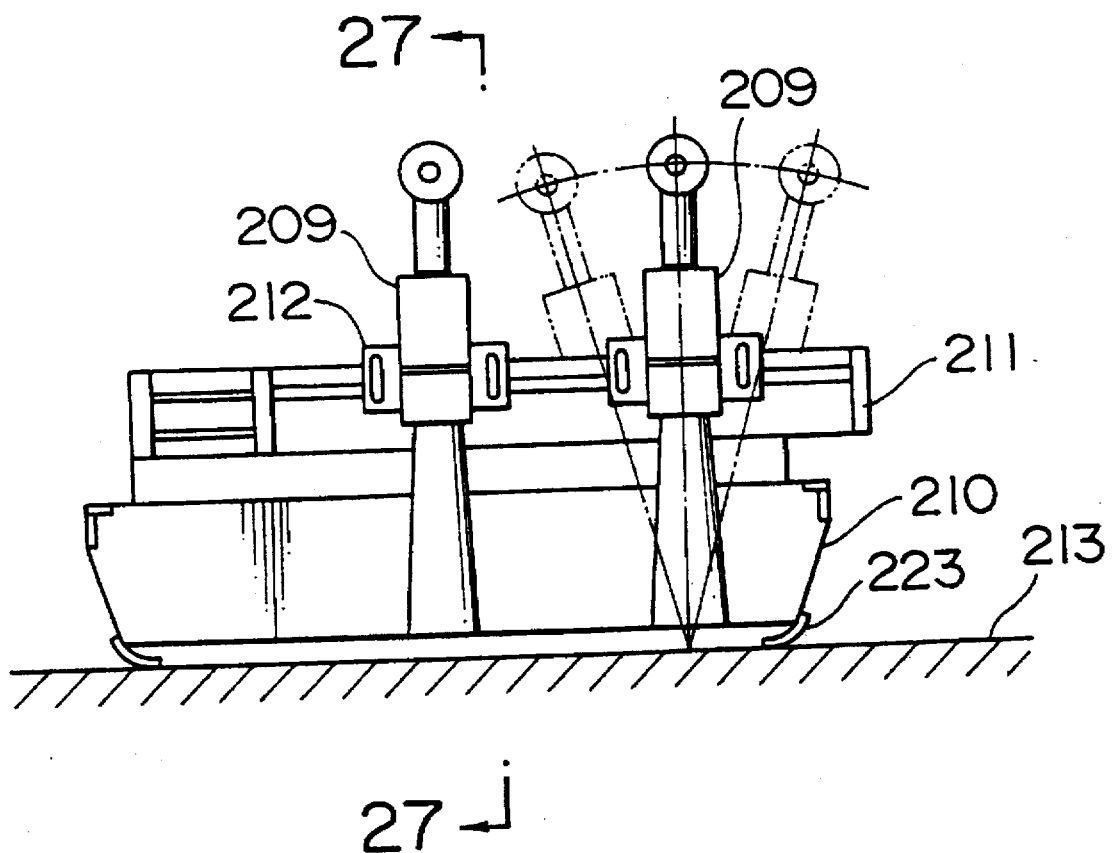
FIG. 26 is a front view of a blast head connected to the recovery/pressure tank system shown in FIG. 25.
Figure 27:
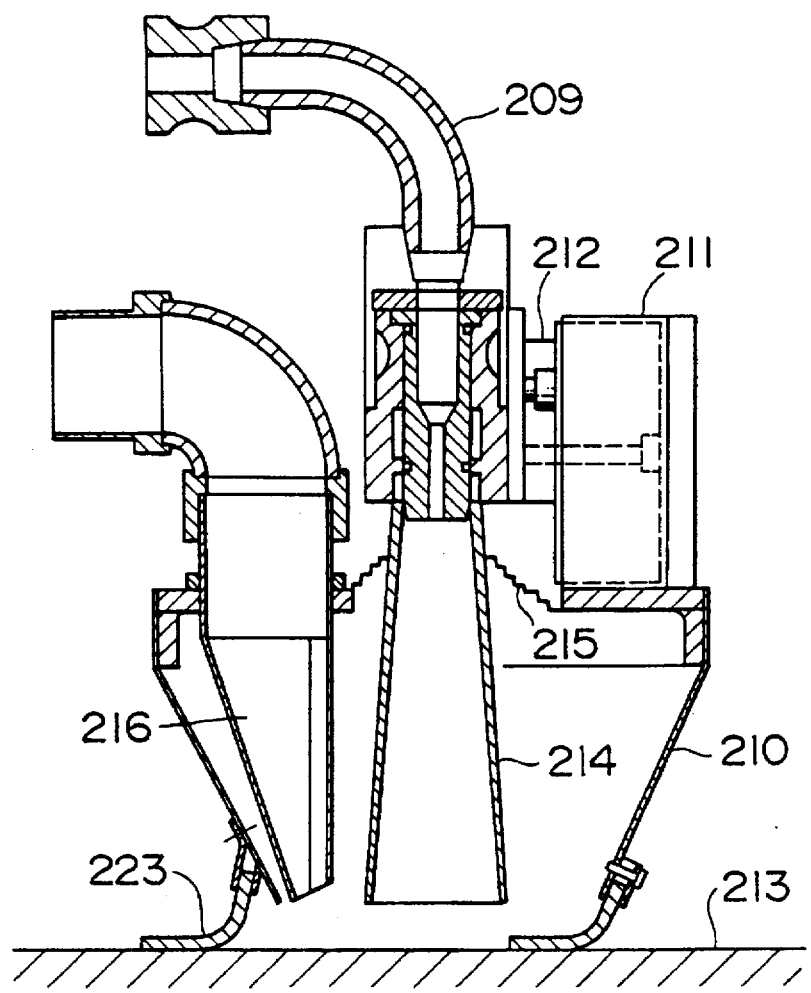
FIG. 27 is a sectional view taken on the plane of the line 27—27 of FIG. 26.
Figure 28:
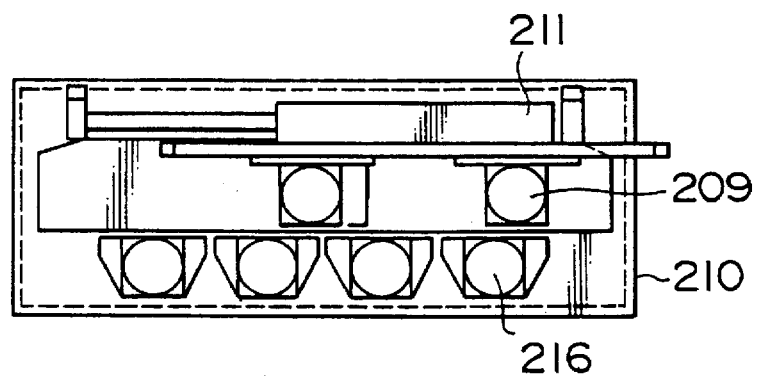
FIG. 28 is a plan view of a blast head shown in FIG. 26.

FIG. 25 is a front view of a recovery/pressure tank system used in the floor surface blasting apparatus according to another embodiment of the present invention, FIG. 26 is a front view of a blast head connected to the recovery/pressure tank system shown in FIG. 25, FIG. 27 is a sectional view taken on the plane of the line 27—27 of FIG. 26, and FIG. 28 is a plan view of a blast head shown in FIG. 26.

First, the recovery/pressure tank system will be described. As shown in FIG. 25, the gate valve 203, which opens or closes the gate by vertical movement, is installed between the recovery tank 201 and the pressure tank 202. The lower part of the pressure tank 202 is divided into right and left parts, and a control valve 204 for controlling the supply of blasting material is mounted at each part. The upper space of the recovery tank 201 is connected to the upper space of the pressure tank 202 by an air bypass pipe 206. The air bypass pipe 206 can be opened/closed by a solenoid valve 205 installed at the intermediate part of the air bypass pipe 206.

With this recovery/pressure tank system, when blasting operation is performed, the pressure in the recovery tank 201 is made negative by using a not illustrated suction device, and the pressure tank 202 is pressurized by supplying high-pressure air through an air inlet pipe 207 by using a not illustrated compressor or other means. Then, the vertically movable gate valve 203 is pushed up, so that the recovery tank 201 is divided from the pressure tank 202, the recovered blasting material being collected in the recovery tank 201. During this process, the solenoid valve 205 is closed.

As the blasting operation is continued, the amount of blasting material in the pressure tank 202 is reduced. Therefore, the blasting material in the recovery tank 201 must be shifted into the pressure tank 202 when necessary. To do this, the control valve 204 is closed to stop the supply of high-pressure air into the pressure tank 202 through the air inlet pipe 207, so that the blasting operation is interrupted temporarily. After that, the suction into the recovery tank 201 is stopped and the solenoid valve is opened. Then, the high-pressure air in the pressure tank 202 flows into the recovery tank, and the internal pressures in the recovery tank 201 and the pressure tank 202 are made equal. As a result, the gate valve 203 is lowered by its weight and the weight of the blasting material, so that the blasting material in the recovery tank 201 drops into the pressure tank 202.

To resume the blasting operation, the solenoid valve 205 is closed and high-pressure air is fed into the pressure tank 202, which pushes up the vertically movable gate valve 203. As a result, the recovery tank 201 is divided from the pressure tank 202, thereby the pressure of the recovery tank 201 is made negative.

The blasting material, whose supply is controlled by the control valve 204, is fed to two blast nozzles 209 together with the high-pressure air through a pipe 208 and a not illustrated blast hose, and blown onto the work 213. Next, the blast head will be described. As shown in FIGS. 26 through 28, the blast nozzle 209 is installed to a slide mechanism 211, which is installed on the blast head 210 and operated transversely by air pressure, via a injection angle variable mechanism 212 which controls the inclination of the blast nozzle 209. At each end of the slide mechanism 211, limit switches (not shown) are mounted to set the oscillation width of blast nozzle 209, that is, the blasting width. The injection angle variable mechanism 212 is provided with an arc-shaped guide so that the clearance between the blast nozzle 209 and the work 213 is kept constant even when the blast nozzle 209 is inclined.

The blast nozzle 209 is installed to the slide mechanism 211 which oscillates over a certain width by using air pressure, and the blast nozzle 209 and the slide mechanism 211 are installed in the blast head 210. By moving the blast nozzle 209 at a constant speed, even a small-diameter, low-capacity blast nozzle 209 provides uniform and wide blasting. If a plurality of blast nozzles 209 with the slide mechanism 211 are installed, wide blasting can be performed with a small oscillation width, and the time required for blasting a certain area can be shortened. In addition, by installing the blast nozzle 209 to a tiltable mechanism, the injection angle of blasting material can be arbitrarily controlled in accordance with the surface shape of the work 213, by which various objects can be blasted by using one blast head 210. This method is particularly effective when it is used on the surface which is not flat, such as lap weld line.

A nylon brush 223 is installed around the lower end of the blast head 210, and the lower end of the brush is in contact with the work 213. Also, a cloth seal 215 is installed between a blast gun outer cylinder 214 and the body of the blast head 210. Therefore, the leakage of blasting material and dust is prevented, and the blast material and the dust are sucked by a suction nozzle 216.

The inventor manufactured the apparatus of the present invention to test the operation and effects thereof. In the test, blasting was performed on a butt weld of plates coated with 200–300 μm tar epoxy paint by using the apparatus of the present invention. The angle of the blast nozzle 209 was perpendicular to the work 213. The blasting material, which was 1.0 mm-dia. steel grid, was injected from each blast nozzle under a pressure of 5 kg/cm$^2$ at a rate of 8 kg/min. Two blast nozzles 209 were installed on the slide mechanism at an interval of 150 mm, and the stroke of the slide mechanism 211 was set to 150 mm to perform blasting of the width of 300 mm with the weld line being the center. The blast head 210 was installed on the work carriage, and the work carriage was moved along the weld line at a speed of 30 cm/min.

The test result was that the coating of 300 mm width was removed along the weld line, and uniform blasting was performed. The blasting material was shifted from the recovery tank 201 to the pressure tank 202 in about 2 seconds, though it took about 20 seconds with the conventional apparatus. Blasting was performed on a lap joint of 10 mm-thick plates in addition of the above-described butt joint. In this case, the blast nozzle 209 was inclined about 30° with respect to the surface of work 213 by driving the injection angle variable mechanism. Other blasting conditions were the same as those for the butt weld. The test result was that the inclined portion of weld, which was insufficiently blasted when the blast nozzle 209 was installed vertically, was blasted satisfactorily.

This blasting apparatus offers the following effects:

(1) The internal pressures of the pressure tank 202 and the recovery tank 201 are made equal rapidly by the air bypass line 206 which is installed between the two tanks and has the valve, so that the recovered blasting material can be rapidly shifted from the recovery tank 201 to the pressure tank 202 for reuse. When a large area is to be blasted, therefore, the interruption time of blasting operation can be shortened and highly efficient blasting can be performed.

(2) Since the blasting material can be supplied form one pressure tank 202 to a plurality of blast nozzles 209, many places can be blasted at the same time with one blasting apparatus.

(3) Since the blast nozzle 209 is installed to the slide mechanism 211, which can oscillate, even a small-diameter, low-capacity blast nozzle 209 can perform uniform and wide blasting.

(4) Since the angle of the blast nozzle 209 can be controlled arbitrarily, a work 213 having a complicated surface shape can be blasted.

FIGS. 29 through 32 show still another embodiment of the floor surface blasting apparatus in accordance width the present invention.

Figure 29:
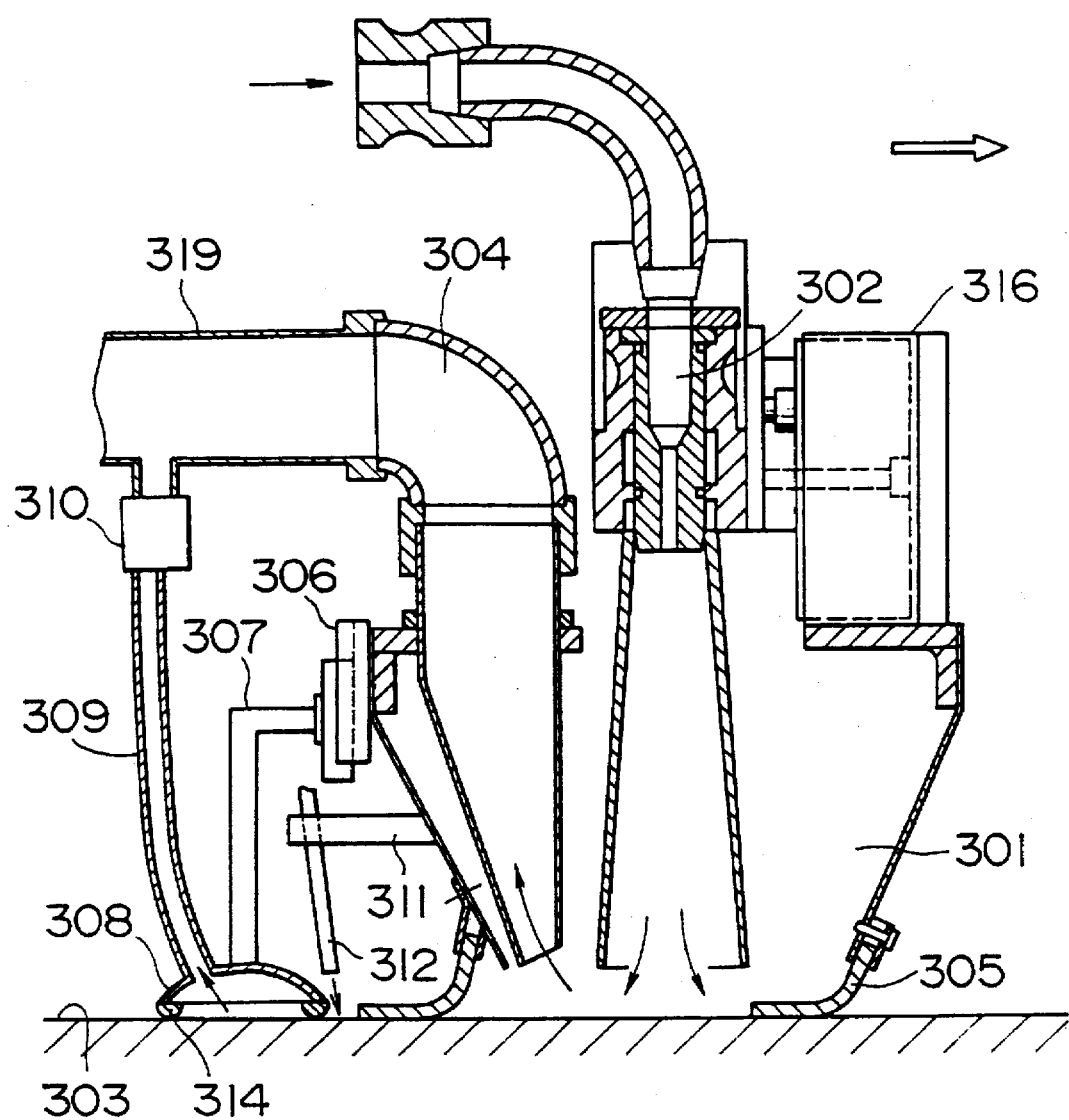
FIG. 29 is a longitudinal sectional view of an embodiment of the blast head.
Figure 30:
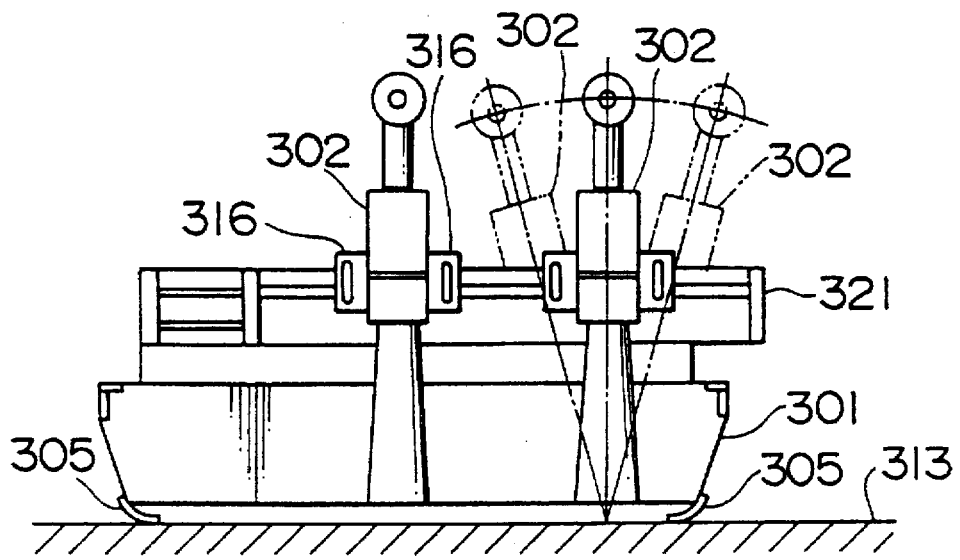
FIG. 30 is a front view of the blast head shown in FIG. 29.
Figure 31:
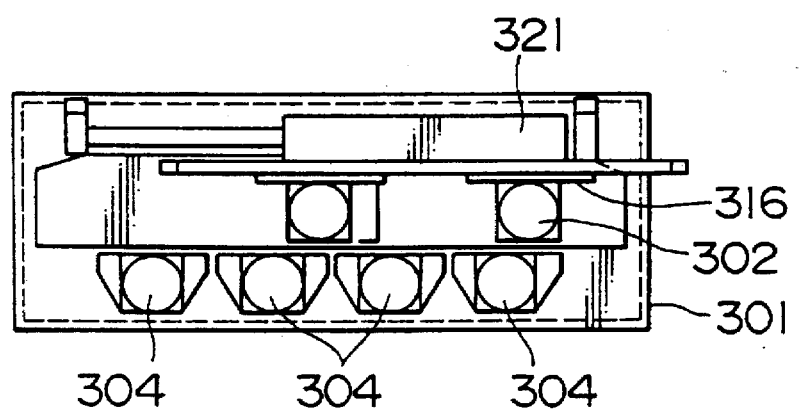
FIG. 31 is a plan view of the blast head shown in FIG. 30.
Figure 32:
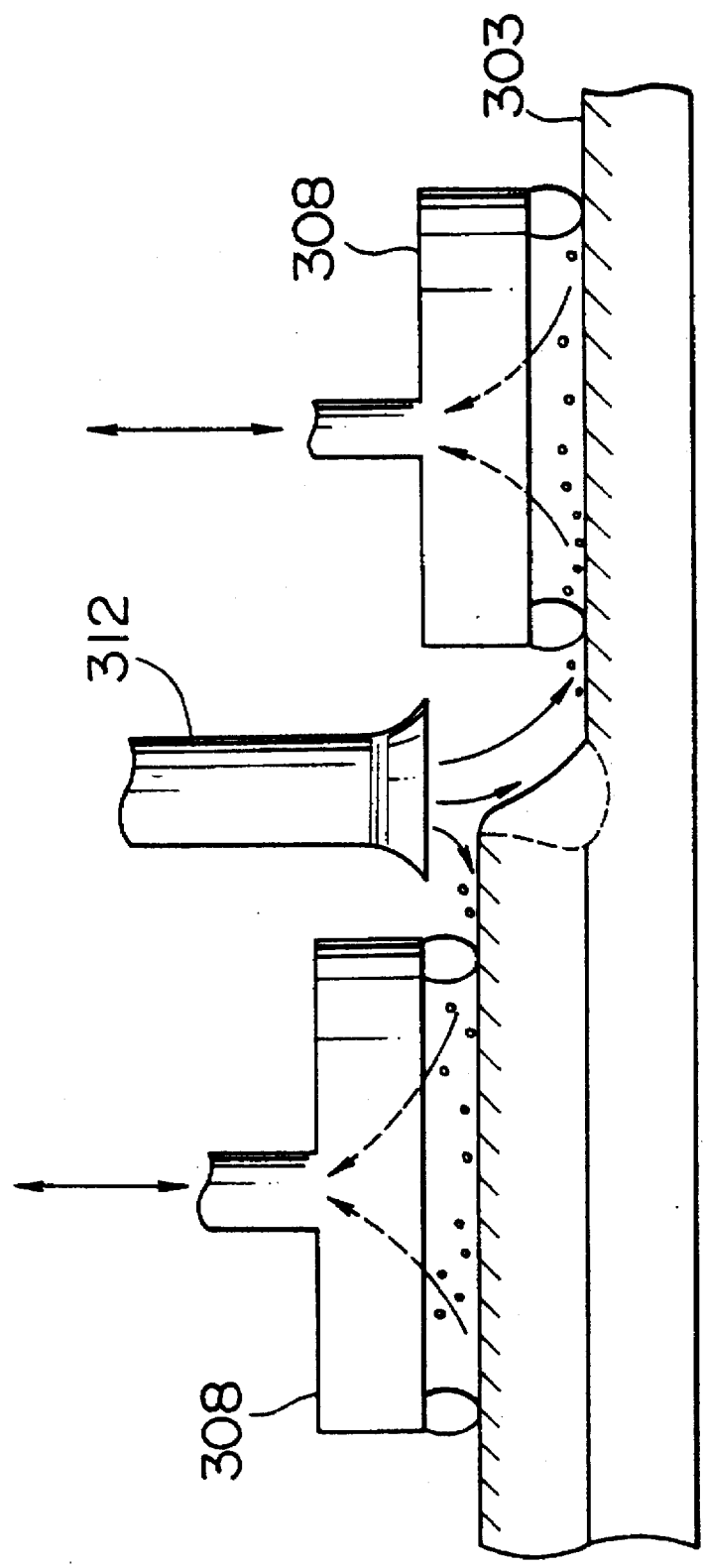
FIG. 32 is a view illustrating a blasting procedure on a work surfacing having a difference.

FIG. 29 is a longitudinal sectional view of the blast head, FIG. 30 is a front view of the blast head shown in FIG. 29, FIG. 31 is a plan view of the blast head shown in FIG. 30, and FIG. 32 is a view illustrating a blasting procedure on a level difference portion of work.

Referring to FIGS. 29 through 31, the blast nozzle 302 is installed to the slide mechanism 321, which is installed on the blast head 301 and moves right and left pneumatically, via a slide unit 316, which controls the inclination of the blast nozzle 302. At each end of the slide unit 316, limit switches (not shown) are mounted to set the oscillation width of the blast nozzle 302, that is, the blasting width. The slide unit 316 is provided with an arc-shaped guide so that the clearance between the blast nozzle 302 and the work 303 is kept constant even when the blast nozzle 302 is inclined.

A nylon brush 305 is installed around the lower end of the blast head 301, and the lower end of the brush is in contact with the work 303. The blast nozzle 302 and the blast head 301 are isolated from blasting material and dust by a cloth boot, and the blasting material and dust are sucked by the suction nozzle 304.

An auxiliary suction nozzle 308 is installed at the lower end of a support arm 307. The upper end of the support arm 307 is supported, in such a manner that it can be vertically slid, by a vertical slide mechanism 306 installed at the upper periphery of the blast head 301. The air in the auxiliary suction nozzle 308 communicates with a recovery pipe 319 of the suction nozzle 304 via a hose 309 and a fitting 310. Reference numeral 314 denotes a plurality of rollers installed at the lower end of the auxiliary suction nozzle 308, and 312 denotes an air injection nozzle which is installed between the auxiliary suction nozzle 308 and a brush 305 and directs air downward. The air injection nozzle 312 is installed at the periphery of the blast head 301 via an arm 311.

The inventor manufactured a blasting apparatus in accordance with the present invention to confirm the operation and effects thereof. The test procedure was as follows: The auxiliary suction nozzles 308 are positioned behind the blast head 301 so that there is an appropriate distance between the two auxiliary suction nozzles at the higher part and the lower part of a level difference portion. A clearance of about 2 mm between the lower end of the auxiliary suction nozzle 308 and the work 303 was maintained by using the rollers 314. The angle of the air injection nozzle 312 was adjusted in the obliquely forward direction so that the blasting material remaining at the level difference blast head was pushed to the front of the auxiliary suction nozzle 308.

The air injected from the air injection nozzle 312 was supplied by using an air pipe which drove the slide unit 316 and by branching it.

In the blasting operation, the blast device was mounted on a work carriage, and moved along a weld line at a constant speed. The test result was that the coating removal and blasting were performed satisfactorily on the surface including a level difference, and the dust which was not recovered by the suction nozzle 304 in the blast head 301 and leaked to the outside of the blast head 301 was sucked almost completely.

Figure 33:
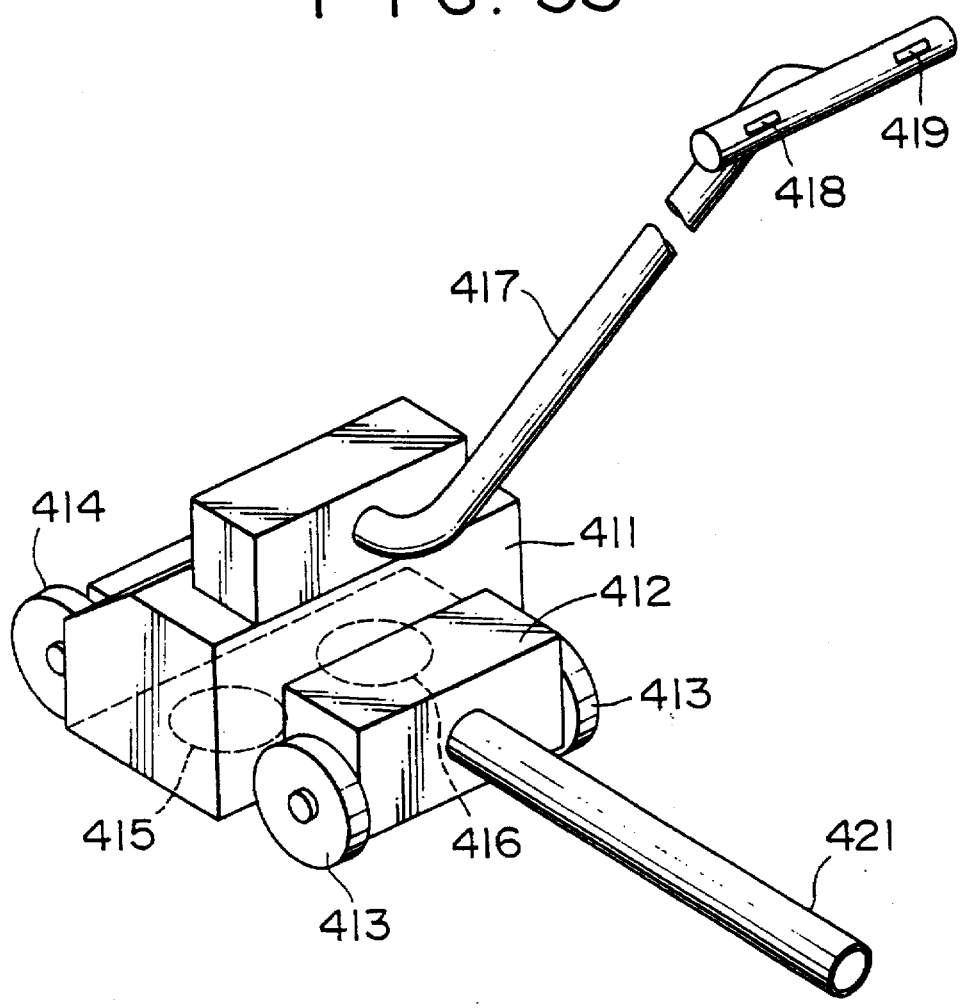
FIG. 33 is a perspective view of a still another embodiment of the floor blasting apparatus in accordance with the present invention.
Figure 34:
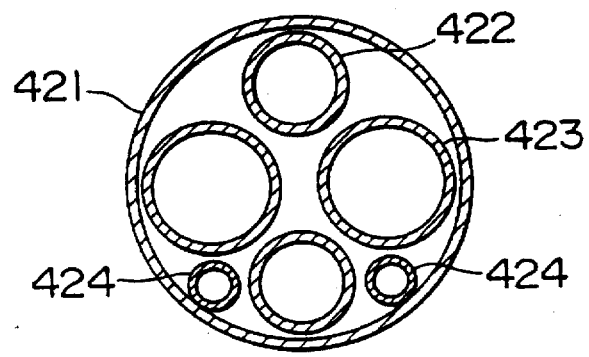
FIG. 34 is a sectional view of a connecting hose.
Figure 36:
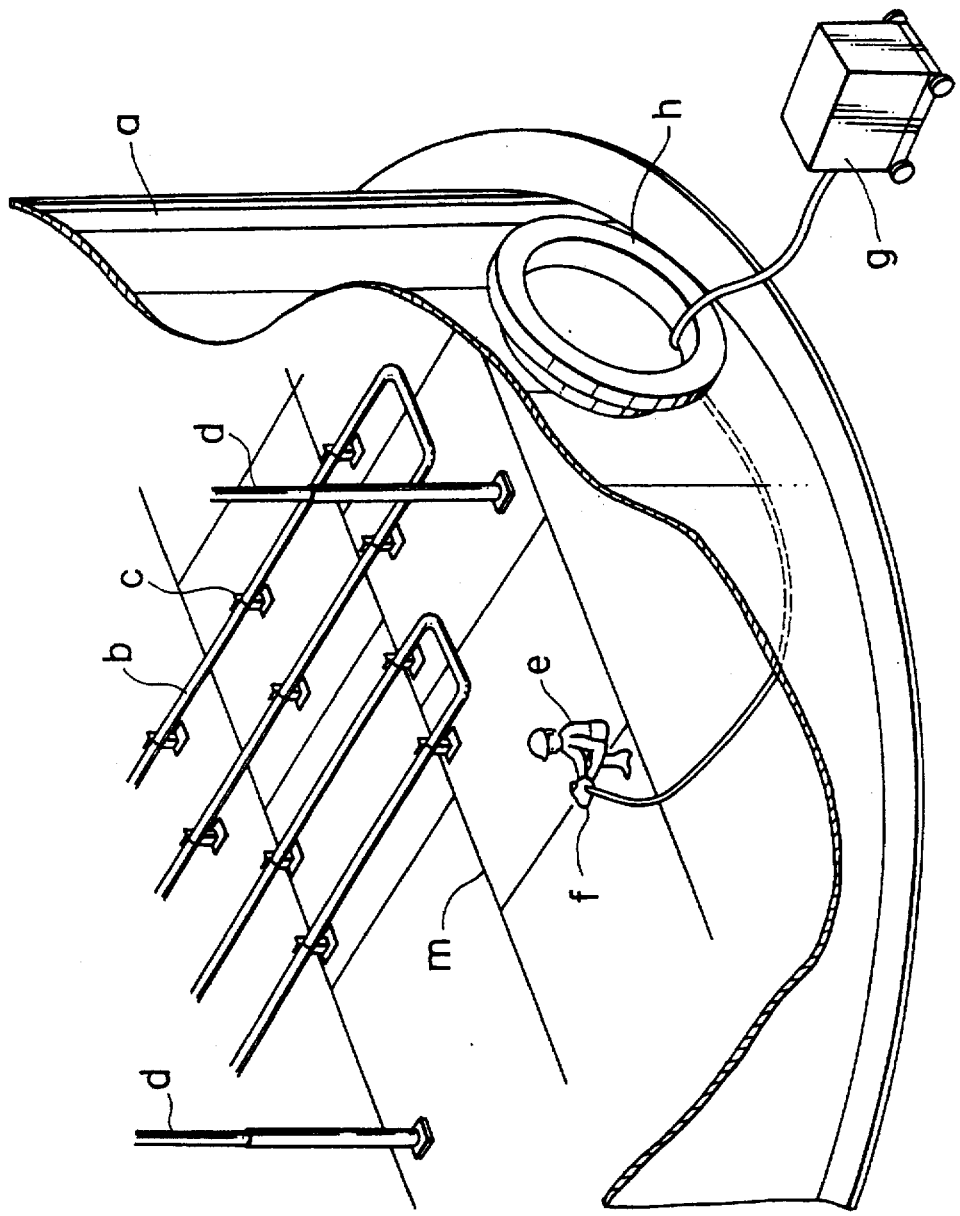
FIG. 36 is a view showing a system of conventional floor surface blasting and, FIG. 37 is a perspective view of a conventional floor surface blasting apparatus.
Figure 37:
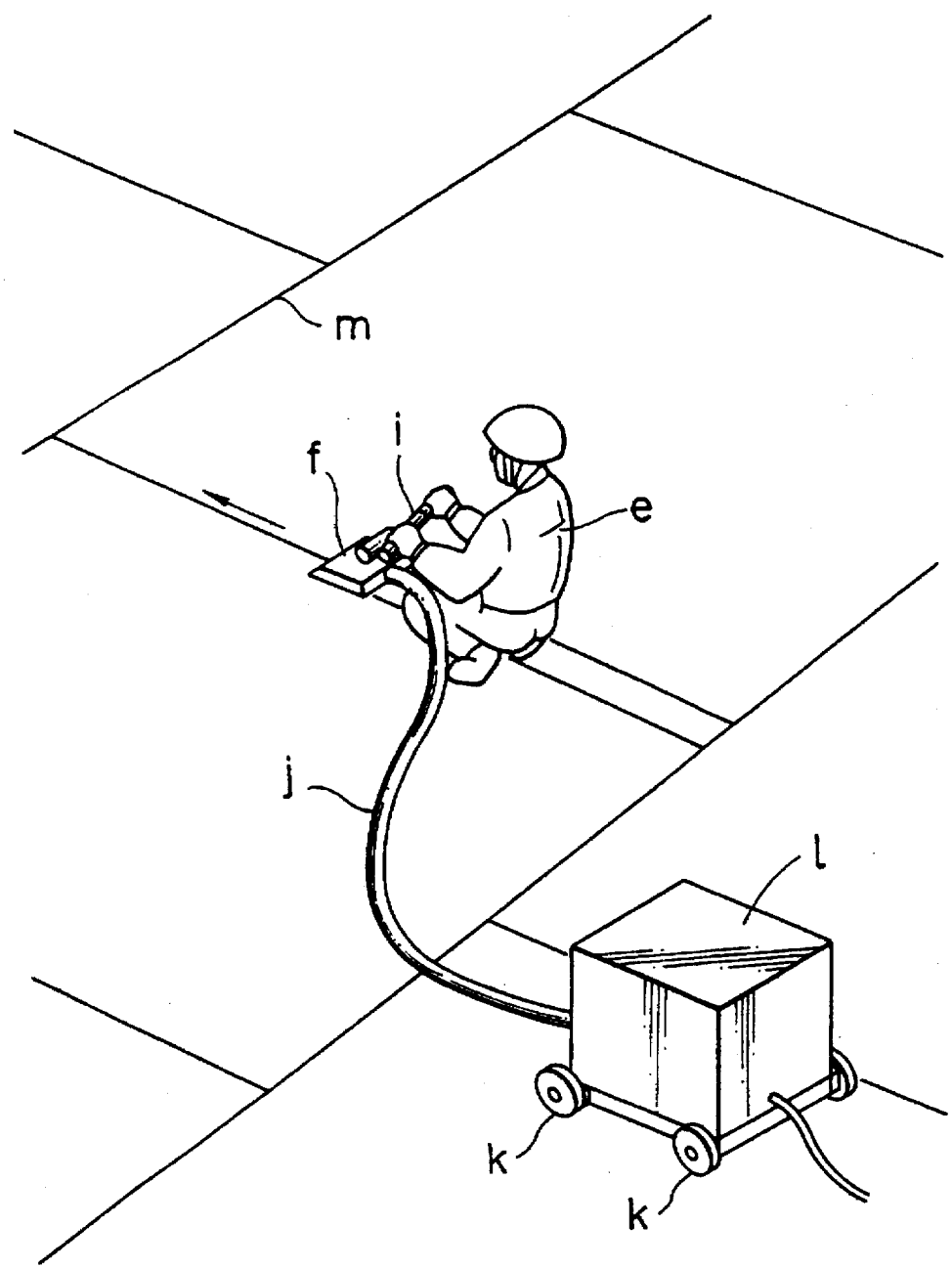

FIGS. 33 through 35 show still another embodiment of the floor surface blasting apparatus in accordance with the present invention.

This embodiment of the present invention will be described with reference to the drawings.

FIG. 33 is a perspective view of a still another embodiment of the floor blasting apparatus in accordance with the present invention, FIG. 34 is a sectional view of a connecting hose, and FIG. 35 is a perspective view showing the use of a blasting apparatus of this embodiment.

In the blasting apparatus of this embodiment, the blast head 411 is of a box shape and has a traveling device 412 at the rear as shown in FIG. 33. The traveling device 412 has a not illustrated drive source such as a drive motor therein, and rotates a set of drive wheels 413 mounted at both sides. In front of the blast head 411 are installed a set of slave wheels 414.

The blast head 411 has a plurality of blast nozzles (two nozzles in this embodiment) 415, 416, which are open downward. On the top of the blast head 411, a T-shaped operation handle 417 is installed. On the top of the operation handle 417 are installed a switch 418 for operating the traveling device 412 and a switch 419 for operating the blast head 411.

As shown in FIG. 35, the blast head 411 is connected to a movable blasting apparatus body 420 via a connecting hose 421. This connecting hose 421 incorporates a blast particle supply hose 422, a particle recovery hose 423, and a power/control cable 424.

When working with the blasting apparatus of this embodiment, an operator holds the operation handle 417 and operates the switch 418 for operating the traveling device. Then, the traveling device 412 rotates the drive wheels 413, and the blast head 411 moves along the weld line 425 on the floor surface of a large fuel tank. The switch 419 for operating the blast head is operated at this time, particles are discharged from the blast nozzle 415, 416, and the particles are recovered after use. Thus, the blasting operation is performed.

In this embodiment, the blast head 411 can be moved by the traveling device 412 by the operation of the switch 418 for operating the traveling device, not by manpower. Therefore, the blast head can be made large, and the diameter of the blast nozzle can be increased.

Since the switch 418 for operating the traveling device and the switch 419 for operating the blast head are installed on the top of the operation handle 417, an operator can perform the traveling, stopping, and turning of the blast head 411 without changing his/her position in a large way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A floor surface blasting apparatus comprising:
    a blast head which incorporates a suction nozzle for recovering blasting material and dust produced by blasting; and
    at least one auxiliary suction nozzle which is installed at a periphery of said blast head for recovering and receiving therein the blasting material and dust leaking outside of a lower end of said blast head.

2. The floor surface blasting apparatus according to claim 1, wherein said floor surface blasting apparatus has a compressed gas injection nozzle for pushing the dust leaking outside from said blast head toward said auxiliary suction nozzle.

3. The floor surface blasting apparatus according to claim 2, wherein said injection nozzle is directed toward said blast head at a non-zero angle with respect to a vertical axis.

4. The floor surface blasting apparatus according to claim 2, wherein said at least one auxiliary suction nozzle comprises a pair of spaced-apart suction nozzles, and said injection nozzle is arranged between said spaced-apart suction nozzles.

5. The floor surface blasting apparatus according to claim 4, wherein said injection nozzle is directed toward said blast head at a non-zero angle with respect to a vertical axis.

6. The floor surface blasting apparatus according to claim 1, further comprising a plurality of rollers located at a lower end of said auxiliary suction nozzle.

7. The floor surface blasting apparatus according to claim 1, further comprising a vertical slide mechanism for vertically moving said auxiliary suction nozzle.

8. The floor surface blasting apparatus according to claim 1, wherein said at least one auxiliary suction nozzle comprises a pair of spaced-apart suction nozzles.

9. The floor surface blasting apparatus according to claim 1, wherein said vertical slide mechanism is operatively connected between said blast head and said auxiliary suction nozzle.

10. The floor surface blasting apparatus according to claim 9, wherein said at least one auxiliary suction nozzle comprises a pair of spaced-apart suction nozzles.

11. The floor surface blasting apparatus according to claim 10, further comprising a plurality of rollers located at a lower end of said auxiliary suction nozzle.

12. The floor surface blasting apparatus according to claim 1, further comprising at least one blast nozzle located in said blast head for ejecting said blasting material therefrom.

13. The floor surface blasting apparatus according to claim 12, further comprising a blast nozzle angle varying mechanism for pivoting the blast nozzle about a substantially horizontal pivot axis.

14. The floor surface blasting apparatus according to claim 13, wherein the blast nozzle angle varying mechanism maintains an end of the blast nozzle at a substantially constant distance from the surface during pivoting of the blast nozzle.

15. The floor surface blasting apparatus according to claim 12, further comprising a blast nozzle slide mechanism for linearly sliding the blast nozzle.

16. The floor surface blasting apparatus according to claim 15, further comprising a blast nozzle angle varying mechanism for pivoting the blast nozzle about a substantially horizontal pivot axis.

17. The floor surface blasting apparatus according to claim 16, wherein the blast nozzle angle varying mechanism maintains an end of the blast nozzle at a substantially constant distance from the surface during pivoting of the blast nozzle.

18. The floor surface blasting apparatus-according to claim 16, further comprising a vertical slide mechanism for vertically moving said auxiliary suction nozzle.

19. The floor surface blasting apparatus according to claim 18, wherein said vertical slide mechanism is operatively connected between said blast head and said auxiliary suction nozzle.

20. The floor surface blasting apparatus according to claim 19, wherein said at least one auxiliary suction nozzle comprises a pair of spaced-apart suction nozzles.

* * * * *